(12) United States Patent
Mihara

(10) Patent No.: US 6,687,059 B2
(45) Date of Patent: Feb. 3, 2004

(54) ZOOM LENS

(75) Inventor: Shinichi Mihara, Tama (JP)

(73) Assignee: Olympus Corporation, Tokyo (JP)

( * ) Notice: Subject to any disclaimer, the term of this patent is extended or adjusted under 35 U.S.C. 154(b) by 168 days.

(21) Appl. No.: 09/741,000

(22) Filed: Dec. 21, 2000

(65) Prior Publication Data

US 2001/0013978 A1 Aug. 16, 2001

(30) Foreign Application Priority Data

Dec. 21, 1999 (JP) ............................................ 11-362681

(51) Int. Cl.[7] ................................................ G02B 15/14
(52) U.S. Cl. ........................ 359/681; 359/680; 359/684
(58) Field of Search ................................ 359/680, 684, 359/682, 681, 686, 676, 683, 685

(56) References Cited

U.S. PATENT DOCUMENTS

| | | | | |
|---|---|---|---|---|
| 4,516,839 A | * | 5/1985 | Tokumaru | 359/681 |
| 4,527,867 A | * | 7/1985 | Fujioka et al. | 359/683 |
| 4,576,444 A | * | 3/1986 | Kawamura | 359/685 |
| 5,132,848 A | | 7/1992 | Nishio | 359/686 |
| 5,229,886 A | | 7/1993 | Tanaka | 359/683 |
| 5,739,960 A | | 4/1998 | Tanaka | 359/683 |
| 5,805,350 A | * | 9/1998 | Yamamoto | 359/686 |
| 6,285,509 B1 | * | 9/2001 | Nakayama et al. | 359/676 |
| 6,320,698 B1 | * | 11/2001 | Suzuki | 359/554 |

FOREIGN PATENT DOCUMENTS

| | | | |
|---|---|---|---|
| GB | 2080966 | * | 2/1982 |
| JP | 59229517 | * | 12/1984 |
| JP | 5-107476 | * | 4/1993 |
| JP | 5-323196 | * | 12/1993 |
| JP | 6-102455 | | 4/1994 |

* cited by examiner

*Primary Examiner*—Scott J. Sugarman
*Assistant Examiner*—Deborah Raizen
(74) *Attorney, Agent, or Firm*—Pillsbury Winthrop LLP

(57) ABSTRACT

The invention relates to a high-performance, large-aperture yet wide-angle zoom lens system that can be used with an electronic image pickup device in particular, a method for focusing the same. In particular, the invention is concerned with a high-performance, large-aperture yet wide-angle zoom lens system which has a zoom ratio of the order of 3 at a diagonal field angle of 75° at its wide-angle end, so that it can be used with a single-lens reflex camera using an electronic image pickup device with the number of pixels being of the order of 6,000,000. The zoom lens system comprises a first lens group G1 having negative refracting power, a second lens group G2 having positive refracting power, a third lens group G3 having negative refracting power, a fourth lens group G4 having positive refracting power and a fifth lens group G5 having positive refracting power. Upon movement of an object point, focusing is carried out with the fifth lens group G5.

11 Claims, 12 Drawing Sheets

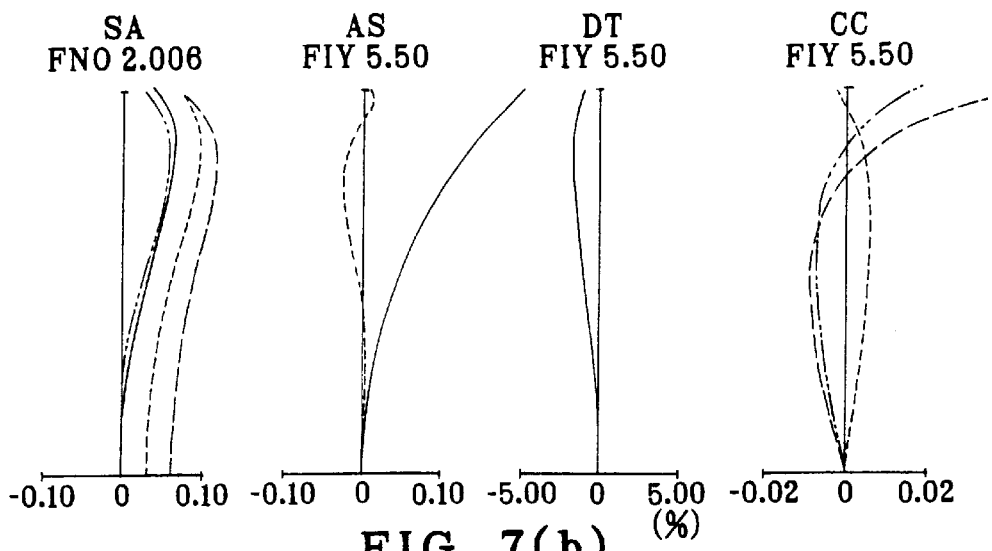
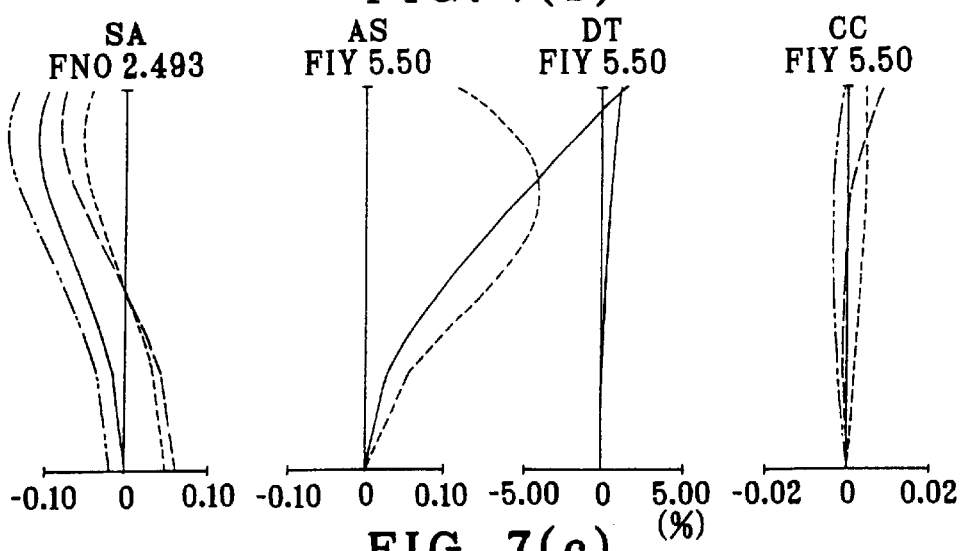
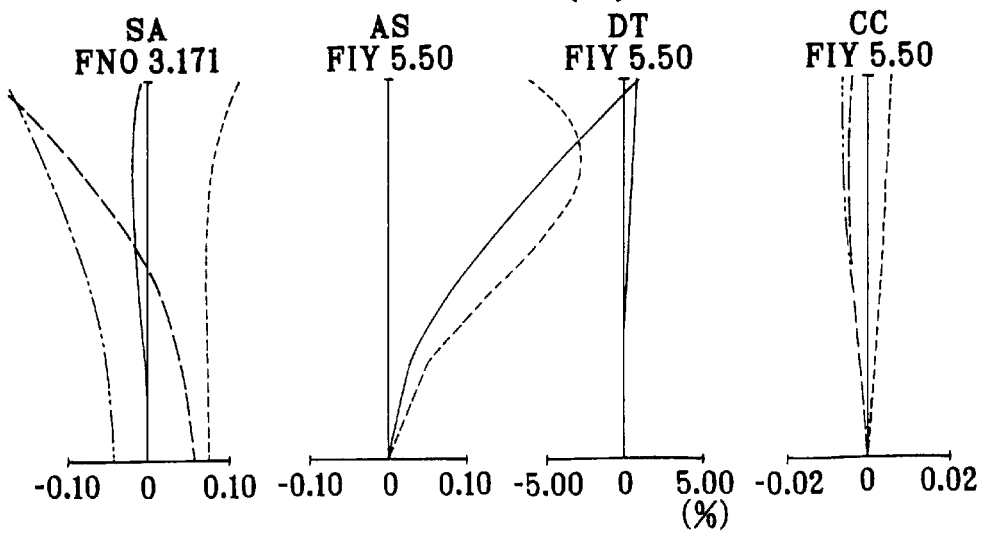

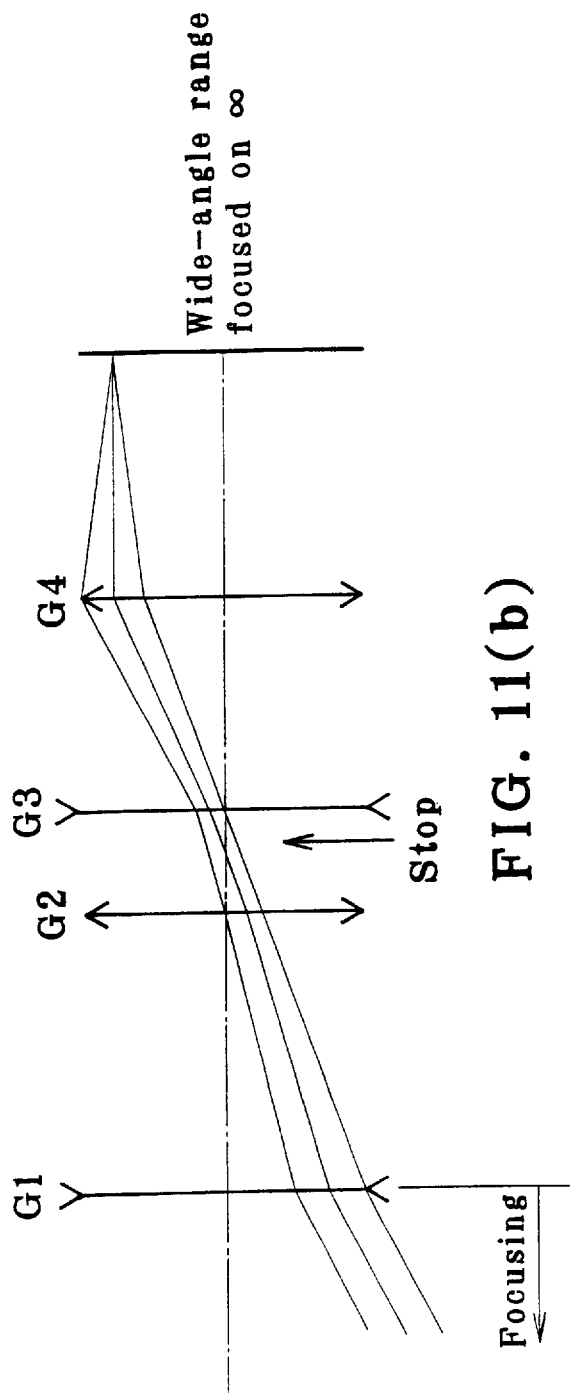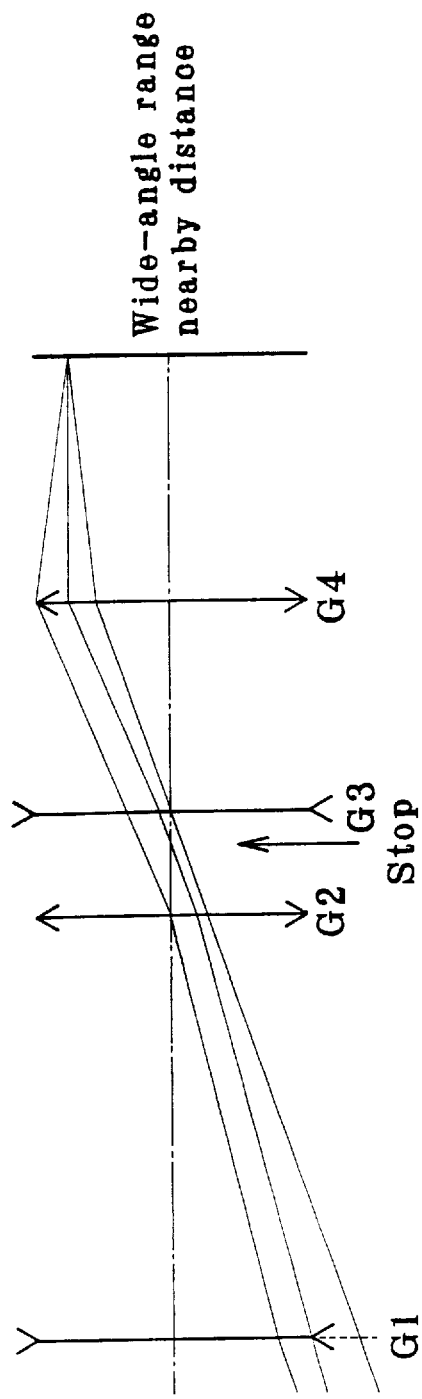

ZOOM LENS

This application claims benefits of Japanese Application (s) No. Hei 11-362681 filed in Japan on Dec. 12, 1999, the contents of which are incorporated by this reference.

BACKGROUND OF THE INVENTION

The present invention relates generally to a zoom lens, and more particularly to a zoom lens system that lends itself to a camera using a CCD or other electronic image pickup device.

In recent years, digital cameras (electronic cameras) have attracted attention as the next generation of cameras taking the place of silver halide 35 mm film (usually called Leica size) cameras. In consumer applications in particular, zoom lenses from a single-focus lens having a diagonal field angle of about 60° to a wide-angle zoom lens having a zoom ratio of the order of 3 have gone mainstream. For current higher-class zoom lenses, much is desired on their wide-angle side or telephoto side and, at the same time, higher-grade cameras of the single-lens reflex type are in demand. As a matter of course, higher image quality, too, is needed. Zoom lenses suitable for use on single-lens reflex cameras having a diagonal field angle of the order of 75°, for instance, are disclosed in JP-A's 4-163415 and 5-27175.

These publications disclose a zoom lens system comprising, in order from an object side thereof, a first lens group having negative refracting power, a second lens group having positive refracting power, a third lens group having negative refracting power and a fourth lens group having positive refracting power, wherein for zooming from the wide-angle end to the telephoto end of the zoom lens system, the respective lens groups move in such a way that the space between the first lens group and the second lens group, and the space between the third lens group and the fourth lens group becomes narrow while the space between the second lens group and the third lens group, and the space between the fourth lens group and an image-formation plane becomes wide. This zoom lens system has a reduced F-number of the order of 2 to 2.8.

However, the number of pixels then suggested for the single-lens reflex type was at most about 1,000,000; the aforesaid publications do no give any suggestion about the achievement of a zoom lens capable of taking full advantage of the performance of an electronic image pickup device expected to have 6,000,000 or 10,000,000 pixels at some future time.

Maintaining performance possible leads to a size increase. This point, too, is the problem to be solved.

In consideration of loads on, and the layout of, a driving system and the effective diameter of the first lens group, a rear focusing mode is preferable for focusing. However, when rear focusing is carried out in the aforesaid zoom lens system wherein the first lens group has negative refracting power, the second lens group has positive refracting power, the third lens group has negative refracting power and the fourth lens group has positive refracting power, some problems arise. For instance, one problem is a fluctuation of aberrations, and another problem is that focusing becomes impossible or the amount of movement of the focusing group should be increased because of the presence of a zooming zone where the magnification of the fourth lens group is equal to or close to life-size.

JP-A 4-264412 or JP-A 9-203861 discloses a zoom lens system comprising a first lens group having negative refracting power, a second lens group having positive refracting power, a third lens group having negative refracting power, a fourth lens group having positive refracting power, and a fifth lens group having positive refracting power and designed to be fixed during zooming. The zooming action is allocated to four lens groups located on the object side of the zoom lens system. However, these publications give no particular suggestion about focusing.

JP-A 6-102455 discloses a rear focusing zoom lens system comprising a first lens group having negative refracting power, a second lens group having positive refracting power, a third lens group having negative refracting power, a fourth lens group having positive refracting power, and a fifth lens group having negative refracting power and designed to move during zooming, wherein rear focusing is carried out with the fifth lens group. The publication shows that the fifth lens group is also movable toward the image side for focusing from an infinite distance to a nearby distance. For an optical system that can be used with a CCD or other electronic image pickup device and so is required to be of substantially telecentric construction, it is not preferable that the lens group located nearest to the image side has negative power, because the whole optical system becomes thick.

SUMMARY OF THE INVENTION

In view of such problems with the prior art as explained above, an object of the present invention is to provide a high-performance, large-aperture yet wide-angle zoom lens system best suited for use with an electronic image pickup device in particular. Another object of the invention is to provide a method for focusing a high-performance, large-aperture yet wide-angle zoom lens system best suited with an electronic image pickup device. Yet another object of the invention is to provide a high-performance, large-aperture yet wide-angle zoom lens system which has a zoom ratio of the order of 3 at a diagonal field angle of 75° (focal length 28 mm class as calculated on a 35 mm size basis) at its wide-angle end, so that it can be used with a single-lens reflex camera using a miniature electronic image pickup device with the number of pixels being of the order of 6,000,000.

According to the present invention, the aforesaid objects are achieved by the provision of a zoom lens system comprising, in order from an object side of the zoom lens system, a first lens group having negative refracting power, a second lens group having positive refracting power, a third lens group having negative refracting power, a fourth lens group having positive refracting power and a fifth lens group having positive refracting power, wherein upon movement of an object point, focusing is carried out with said fifth lens group.

Why the aforesaid arrangement is used in the present invention, and how it work is now explained.

As already pointed out with reference to the prior art, the zoom lens arrangement of −+−+ construction is suitable for a wide-angle arrangement. In this arrangement, the fourth lens group is divided to a fourth lens subgroup having positive refracting power and a fifth lens subgroup having positive refracting power to reduce fluctuations of aberrations with zooming, and ensure telecentric performance without increasing the thickness of the whole optical system. In addition, it is possible to carry out rear focusing (with the lens group located nearest to the image side of the zoom lens system) while the amount of movement of the lens group is reduced with a limited deterioration of the image formation capability upon focusing all over the zooming area.

FIGS. 11 to 13 are geometries illustrative of the actions of the present invention. FIG. 11 illustrates one conventional case where the first lens group G1 is used in the form of a focusing group. As can be seen from the state of FIG. 11(b) where the first lens group G1 is moved out of the state of FIG. 11(a), the effective diameter of the first lens group G1 must be increased for focusing. FIG. 12 illustrates another conventional case where a zoom lens arrangement of –+–+– construction is achieved by locating a negative lens group G1 to the image side; the first lens group G1 is used in the form of a focusing group, and shows that for a telecentric optical system it is necessary to increase the effective diameter of the fourth lens group G4. FIG. 13 illustrates one zoom lens arrangement of the present invention, and shows that it provides an efficient optical system. Although not understood from FIG. 13, the spacing layout between the fourth lens group G4 and the fifth lens group G5 upon zooming enables fluctuations of off-axis aberrations such as coma and field curvature to be effectively reduced. For instance, focus detection may be carried out by not only triangulation or a phase contrast method but also a contrast method on the basis of information obtained from an image pickup device.

In the present invention, it is preferable to satisfy any one of the following conditions because it is easy to take full advantage of the merit of rear focusing.

$$-0.2 < \beta v < 0.8 \quad (1)$$

$$0.6 < \Delta L5/\Delta L4 < 1.2 \quad (2)$$

$$0.05 < D45/f5 < 0.15 \quad (3)$$

Here $\beta v$ is the magnification of the fifth lens group upon focused on an infinite object point at the wide-angle end, $\Delta L4$ is the amount of movement of the fourth lens group from the wide-angle end to the telephoto end upon focused on an infinite object point, $\Delta L5$ is the amount of movement of the fifth lens group from the wide-angle end to the telephoto end upon focused on an infinite object point, D45 is the air space on the optical axis between the fourth lens group and the fifth lens group upon focused on an infinite object point at the telephoto end, and $f_5$ is the focal length of the fifth lens group.

It is more preferable that the following conditions should be independently satisfied.

$$0 < \beta v < 0.7 \quad (1')$$

$$0.7 < \Delta L5/\Delta L4 < 1.1 \quad (2')$$

$$0.06 < D45/f5 < 0.12 \quad (3')$$

It is most preferable that the following conditions should be independently satisfied.

$$0.2 < \beta v < 0.6 \quad (1'')$$

$$0.8 < \Delta L5/\Delta L4 < 1.05 \quad (2'')$$

$$0.07 < D45/f5 < 0.1 \quad (3'')$$

The aforesaid condition (1) provides a definition of the magnification, $\beta v$, of the fifth lens group upon focused on an infinite object point at the wide-angle end. Exceeding the upper limit of 0.8 is not preferable because the amount of focusing movement of the fifth lens group is likely to increase, resulting in the need of much space. Falling below the lower limit of –0.2 is again not preferable because the power and diameter of the fifth lens group tend to increase, resulting in a failure in ensuring the edge of the lens.

Condition (2) provides a definition of the amount-of-movement ratio, $\Delta L5/\Delta L4$, of the fifth to the fourth lens group upon movement from the wide-angle end to the telephoto end while the system is focused on an infinite object point. The amount of movement of the focusing (fifth) group upon focused on a nearby object point is approximately the square of the zoom ratio at the telephoto end with respect to the wide-angle end, and so the upper limit to this condition must be 1.2, preferably 1, and more preferably 0.9. On the other hand, a part of the zooming action of the present zoom lens system is allocated to the combined fourth and fifth lens groups that come close to the third lens group. However, falling below the lower limit of 0.6 is not preferable. This is because although the movement of the fourth lens group toward the third lens group is sufficient, the movement of the combined fourth and fifth lens groups to the principal point is insufficient and, hence, the zooming effect becomes slender.

Condition (3) provides a definition of the air space D45 on the optical axis between the fourth lens group and the fifth lens group upon focused on an infinite object point at the telephoto end. Exceeding the upper limit of 0.15 is not preferable because of a slight decrease in the zoom ratio or an increase in the length of the system, large fluctuations of the position of the exit pupil with zooming, etc. Falling below the lower limit of 0.05 makes close-up impossible because of insufficient focusing strokes.

Although the fifth lens group has a focusing function, large fluctuations of aberrations with focusing are not preferable. In addition, the fifth lens group takes a role in keeping the zoom lens system telecentric at the exit side. However, it is noted that this lens group is prone to off-axis aberrations. Thus, it is desired that the fifth lens group be made up of a positive single lens component including an aspherical surface or, alternatively, two lenses, i.e., a negative lens and a positive lens (which may be cemented together to form a positive doublet). Here let R51 stand for the radius of curvature of the surface located nearest to the object side in the fifth lens group and R52 represent the radius of curvature of the surface located nearest to the image side therein. It is then preferable to satisfy any one of the following conditions.

$$-2 < (R51+R52)/(R51-R52) < 0.2 \quad (4)$$

or $$-1.5 < (R51+R52)/(R51-R52) < 0 \quad (4')$$

or $$-1.2 < (R51+R52)/(R51-R52) < -0.2 \quad (4'')$$

Any deviation from these ranges makes it impossible to place axial aberrations and off-axis aberrations in a well-balanced state, and renders it difficult to obtain flat characteristics all over the effective screen.

The second aspect of the high-performance, large-aperture yet wide-angle zoom lens system according to the present invention is now explained.

According to the second aspect of the present invention, there is provided a zoom lens system comprising, in order from an object side of the zoom lens system, at least a first lens group having negative refracting power, a second lens group positive refracting power, a third lens group having negative refracting power and a fourth lens group having positive refracting power, wherein said first lens group comprises, in order from an object side thereof, a positive lens, a negative meniscus lens and a negative lens component defined by a cemented lens consisting of a negative lens and a positive meniscus lens and satisfy the following conditions to keep high image-formation capability over a wide field angle.

$$-4.0 < f1/fw < -1.5 \tag{5}$$

$$1.55 < n1 < 1.8 \tag{6}$$

$$1.3 < R4/fw < 3.5 \tag{7}$$

$$37 < \upsilon1 < 83 \tag{8}$$

Here f1 is the focal length of the first lens group, fw is the focal length of the zoom lens system at its wide-angle end, n1 is the refractive index of the medium of the positive lens located nearest to the object side in the first lens group, R4 is the radius of curvature of the concave surface of the negative meniscus lens in the first lens group, and υ1 is the Abbe number of the medium of the positive lens located nearest to the object side in the first lens group.

More preferably, the following conditions should be independently satisfied.

$$-3.5 < f1/fw < -1.6 \tag{5'}$$

$$1.6 < n1 < 1.8 \tag{6'}$$

$$1.5 < R4/fw < 3 \tag{7'}$$

$$39 < \upsilon1 < 65 \tag{8'}$$

Even more preferably, the following conditions should be independently satisfied.

$$-3.2 < f1/fw < -1.7 \tag{5''}$$

$$1.65 < n1 < 1.8 \tag{6''}$$

$$1.7 < R4/fw < 2.5 \tag{7''}$$

$$45 < \upsilon1 < 56 \tag{8''}$$

Condition (5) provides a definition of the whole focal length, f1, of the first lens group in view of the focal length, fw, of the zoom lens system at the wide-angle end. When the upper limit of −1.5 is exceeded, the radius of curvature of the concave surface of the aforesaid negative meniscus lens should be reduced to such an extent that it can hardly constructed as such and, at the same time, various off-axis aberrations become worse. Falling below the lower limit of −4.0 may be favorable for correction of aberrations. However, this makes the entrance pupil likely to be located at a deep position (or located nearer to the image plane side) and so makes the diameter of the first lens group likely to increase excessively.

Condition (6) provides a definition of the refractive index, n1, of the medium of the positive lens located nearest to the object side in the first lens group. The high-performance, large-aperture yet wide-angle zoom lens system according to the second aspect of the present invention is likely to have a negative Petzval sum. Exceeding the upper limit of 1.8 is unfavorable for correction of the Petzval sum, and makes astigmatism likely to become worse. When the lower limit of 1.55 is not reached, higher-order aberrations are likely to occur at a large field angle.

Condition (7) provides a definition of the radius of curvature, R4, of the concave surface of the aforesaid negative meniscus lens in the first lens group. The power of this surface has a dominant influence on the whole power of the first lens group as well as on the position of the entrance pupil. Exceeding the upper limit of 3.5 makes the entrance pupil to be located at a deep position and so the diameter of the first lens group likely to increase excessively. When the lower limit of 1.3 is not reached, the meniscus lens can hardly be constructed as such simultaneously with various off-axis aberrations becoming worse.

Condition (8) provides a definition of the Abbe number, υ1, of the medium of the positive lens located nearest to the object side in the first lens group. When the upper limit of 83 is exceeded, it is difficult to make correction for longitudinal chromatic aberration as well as chromatic aberration of magnification (a transverse aberration component proportional to an image height). When the lower limit of 37 is not reached, some considerable non-linearity is added to the chromatic aberration of magnification (color distortion) and so noticeable color mismatch tends to occur on the periphery of the screen.

The high-performance, large-aperture yet wide-angle zoom lens system according to the third aspect of the present invention is now explained.

According to the third aspect of the present invention, there is provided a zoom lens system comprising, in order from an object side of the zoom lens system, at least a first lens group having negative refracting power, a second lens group having positive refracting power, a third lens group having negative refracting power and a fourth lens group having positive refracting power, wherein said first lens group comprises, in order from an object side thereof, a positive lens, a negative meniscus lens, a negative lens and a positive meniscus lens, and condition (9) is satisfied with respect to a space D6 between said negative lens and said positive meniscus lens in said first lens group so as to decrease the diameter of said first lens group which tends to increase, while conditions (10) to (13) are satisfied.

$$0.5 < D6/fw < 1.2 \tag{9}$$

$$-4.0 < f1/fw < -1.5 \tag{10}$$

$$1.55 < n1 < 1.8 \tag{11}$$

$$1.3 < R4/fw < 3.5 \tag{12}$$

$$37 < \upsilon1 < 83 \tag{13}$$

Here D6 is the space between the negative lens and the positive meniscus lens in the first lens group, f1 is the focal length of the first lens group, fw is the focal length of the zoom lens system at its wide-angle end, n1 is the refractive index of the medium of the positive lens located nearest to the object side in the first lens group, R4 is the radius of curvature of the concave surface of the negative meniscus lens in the first lens group, and υ1 is the Abbe number of the medium of the positive lens located nearest to the object side in the first lens group.

More preferably, the zoom lens system according to this aspect should independently satisfy the following conditions.

$$0.6 < D6/fw < 1.1 \tag{9'}$$

$$-3.5 < f1/fw < -1.6 \tag{10'}$$

$$1.6 < n1 < 1.8 \tag{11'}$$

$$1.5 < R4/fw < 3 \tag{12'}$$

$$39 < \upsilon1 < 65 \tag{13'}$$

Even more preferably, the zoom lens system according to this aspect should independently satisfy the following conditions.

$$0.7 < D6/fw < 1.0 \quad (9")$$

$$-3.2 < f1/fw < -1.7 \quad (10")$$

$$1.65 < n1 < 1.8 \quad (11")$$

$$1.7 < R4/fw < 2.5 \quad (12")$$

$$45 < \upsilon 1 < 56 \quad (13')$$

When the lower limit of 0.5 to condition (9) is not reached, the diameter of the first lens group is likely to increase. When the upper limit of 1.2 is exceeded, on the other hand, the diameter of the first lens group may be decreased. However, the inherently small diameter of the second lens group tends to become large. This will in turn make it difficult to ensure the edge of the second lens group or the second lens group likely to increase excessively in diameter or deteriorate.

Conditions (10) to (13) are provided for the same reasons as conditions (5) to (8) in the second aspect of the present invention.

The high-performance, large-aperture yet wide-angle zoom lens system according to the fourth aspect of the present invention is now explained.

According to this aspect, there is provided a large-aperture yet wide-angle zoom lens system comprising, in order from an object side of the zoom lens system, at least a first lens group having negative refracting power, a second lens group having positive refracting power, a third lens group having negative refracting power and a fourth lens group having positive refracting power, wherein said first lens group comprises, in order from an object side thereof, a negative meniscus lens, a negative lens, and a positive meniscus lens component consisting of a positive lens and a negative lens that are cemented together, and satisfies conditions (14) and (15).

$$-4.0 < f1/fw < -1.5 \quad (14)$$

$$1.3 < R2/fw < 3.5 \quad (15)$$

Here f1 is the focal length of the first lens group, fw is the focal length of the zoom lens system at its wide-angle end, and R2 is the radius of curvature of the concave surface of the negative meniscus lens in the first lens group.

More preferably, the zoom lens system according to this aspect should independently satisfy the following conditions.

$$-3.5 < f1/fw < -1.6 \quad (14')$$

$$1.5 < R2/fw < 3 \quad (15')$$

Even more preferably, the zoom lens system according to this aspect should independently satisfy the following conditions.

$$-3.2 < f1/fw < -1.7 \quad (14")$$

$$1.7 < R2/fw < 2.5 \quad (15")$$

Condition (14) is provided for the same reasons as conditions (5) and (10), and condition (15) that defines the radius of curvature, R2, of the concave surface of the negative meniscus lens in the first lens group is provided for the same reasons as conditions (7) and (12).

If at least one aspherical surface is added to the first lens group, it is then possible to make improvements in image-formation capabilities with no change in the number of lenses.

It is here noted that if such a refractive index profile as defined below is applied to each of the zoom lens systems according to the present invention, it is possible to make better correction for aberrations. To be more specific, the following conditions should preferably be satisfied with respect to the absolute value, $f_{1abs}$, of the focal length of the first lens group and the absolute value, $Hb_{1abs}$, of the position of the rear principal point of the first lens group (i.e., the distance on the optical axis between the rear principal point of the first lens group and the surface nearest to the image side in the first lens group).

$$0.15 < Hb_{1abs}/f_{1abs} < 0.9 \quad (16)$$

or $$0.2 < Hb_{1abs}/f_{1abs} < 0.8 \quad (16')$$

or $$0.25 < Hb_{1abs}/f_{1abs} < 0.7 \quad (16")$$

When the upper limit of 0.9 to condition (16) is exceeded, the height of a ray incident on the second lens group becomes too large to ensure the edge of the positive lens in the second lens group and make correction for spherical aberrations. When the lower limit of 0.15 is not reached, the entrance pupil is located at too deep a position where the diameter of the front lens is likely to become large.

Any one of the following conditions should preferably be satisfied in view of the correlation between the first lens group and the second lens group. It is here noted that $f_2$ is a focal length of the second lens group.

$$0.7 \times 10^{-2} \ mm^{-1} < Hb_{1abs}/(f_{1abs} \cdot f_2) < 6 \times 10^{-2} \ mm^{-1} \quad (17)$$

or $$0.8 \times 10^{-2} \ mm^{-1} < Hb_{1abs}/(f_{1abs} \cdot f_2) < 5 \times 10^{-2} \ mm^{-1} \quad (17')$$

or $$0.9 \times 10^{-2} \ mm^{-1} < Hb_{1abs}/(f_{1abs} \cdot f_2) < 4 \times 10^{-2} \ mm^{-1} \quad (17")$$

When the upper limit of $6 \times 10^{-2}$ mm to condition (17) is exceeded, fluctuations of spherical aberrations, esp., chromatic spherical aberration with zooming are likely to become large. When the lower limit of $0.7 \times 10^{-2}$ mm is not reached, the whole length of the zoom lens system is likely to increase with an increase in the diameter of the front lens.

The third lens group should preferably comprise two lens components or a cemented concave lens component and a negative single lens component, and satisfy the following condition.

$$0.1 < f31/f32 < 1 \quad (18)$$

Here f31 is the focal length of the cemented concave lens component in the third lens group, and f32 is the focal length of the negative single lens in the third lens group.

More preferably, $$0.2 < f31/f32 < 0.9 \quad (18')$$

Even more preferably, $$0.3 < f31/f32 < 0.8 \quad (18")$$

When the upper limit of 1 to condition (18) is exceeded, it is difficult to make correction for off-axis aberrations because of an increase in the height of a chief ray incident on the fourth lens group. When the lower limit of 0.1 is not reached, spherical aberrations, esp., chromatic spherical aberration are likely to become prominent in the third lens group.

Even more preferably in the present invention, at least two of the three conditions (16), (17) and (18) should be satisfied. As a matter of course, (16') or (16") may be used in place of (16), (17') or (17") may be used in place of (17), (18') or (18") may be used in place of (18) or the like.

Throughout the first to fourth aspects of the present invention, it is commonly preferable that during zooming from the wide-angle end to the telephoto end, the first lens group moves closer to the image side at the telephoto end than at the wide-angle end, the second and fourth lens groups move constantly toward the object side and the third lens group remains fixed. In view of the construction of the lens barrel and from an optical standpoint, it is preferable to move the second and fourth lens groups together. An aperture stop should preferably be located in the vicinity of the third lens group. In other words, the aperture stop should preferably be located in an air space on the object or image side of the third lens group or fixed in the third lens group. Alternatively, the aperture stop may be made integral with the second lens group.

Each of the aforesaid arrangements lends itself to a zoom lens having a zoom ratio of at least 2.7 as well as to a zoom lens having a field angle, 2ω, of 70° or greater at its wide-angle end. In addition, the arrangement is suitable for a zoom lens having a reduced F-number of 3.5 or less, and preferably 2.8 or less, all over the zooming area when the aperture stop remains open.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 7(*a*), 7(*b*) and 7(*c*) are aberration diagrams for Example 3 upon focused at infinity.

FIGS. 11(*a*) and 11(*b*) are geometries illustrative of a conventional type zoom lens wherein the first lens group is used as a focusing group.

DESCRIPTION OF THE PREFERRED EMBODIMENTS

Examples 1 to 4 of the zoom lens system according to the present invention are now described. Numerical data on the zoom lens system according to each example will be enumerated later. The unit of length is mm.

FIGS. 1 to 4 are sectional schematics illustrative of the lens arrangements of Examples 1 to 4 of the zoom lens system according to the present invention. The zooming movement of each lens group from the wide-angle end to the telephoto end is traced schematically by an arrow. In FIGS. 1 to 4, three plane-parallel plates are located between the fifth lens group G5 and the image plane. In order from the object side of the zoom lens system, these plates provide a finder splitter prism, a low-pass filter, and an IR cut filter, respectively.

Figure 1:
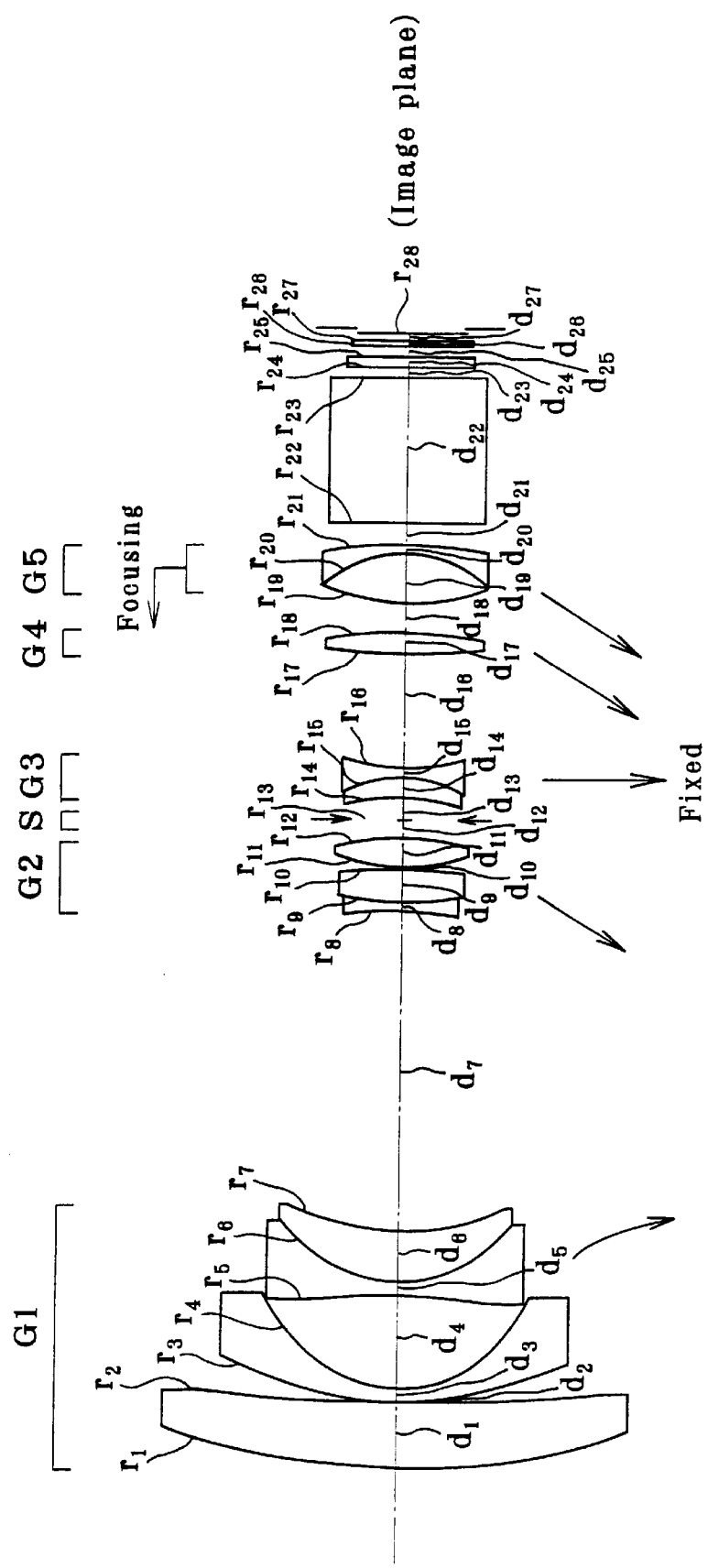
FIG. 1 is a sectional schematic illustrative of the lens arrangement of Example 1 of the zoom lens system according to the invention at its wide-angle end.

Example 1 is directed to a zoom lens system having a focal length of 7.00 to 21.00, a field angle of 76.30 to 29.4° and an F-number of 2.04 to 2.73. As shown in FIG. 1, the first lens group G1 is made up of a positive meniscus lens convex on an object side thereof, a negative meniscus lens convex on an object side thereof and a cemented lens consisting of a double-concave negative lens and a positive meniscus lens convex on an object side thereof. The second lens group G2 is made up of a cemented lens consisting of a double-concave negative lens and a double-convex positive lens, and a double-convex positive lens with a stop S located in the rear thereof. The third lens group G3 is made up of a cemented lens consisting of a positive meniscus lens convex on an image plane side thereof and a double-concave negative lens. The fourth lens group G4 is made up of one double-convex positive lens. The fifth lens group G5 is made up of a cemented lens consisting of a double-convex positive lens and a negative meniscus lens convex on an image plane side thereof. Three aspherical surfaces are used; one at the object side-surface of the cemented lens in the first lens group G1, one at the object side-surface of the double-convex positive lens in the second lens group G2 and one at the image plane side-surface of the double-convex positive lens in the fourth lens group G4. During zooming from the wide-angle end to the telephoto end of the zoom lens system, the stop S and the third lens group G3 remain fixed, while the first lens group G1 moves toward the image plane side, the second lens group G2 moves toward the object side and the fourth and fifth lens groups G4 and G5 move toward the object side, as indicated by arrows. In the meantime, the space between the first and second lens groups G1 and G2, the space between the third and fourth lens groups G3 and G4, and the space between the third and fifth lens groups G3 and G5 becomes narrow. On the other hand, the space between the second and third lens groups G2 and G3, the space between the fourth lens group G4 and the image plane, and the space between the fifth lens group G5 and the image plane becomes wide. Upon movement of an object point, focusing is carried out with the fifth lens group G5. In this case, the fifth lens group G5 is moved toward the object side for focusing from the infinite direction to a nearby distance direction.

Figure 2:
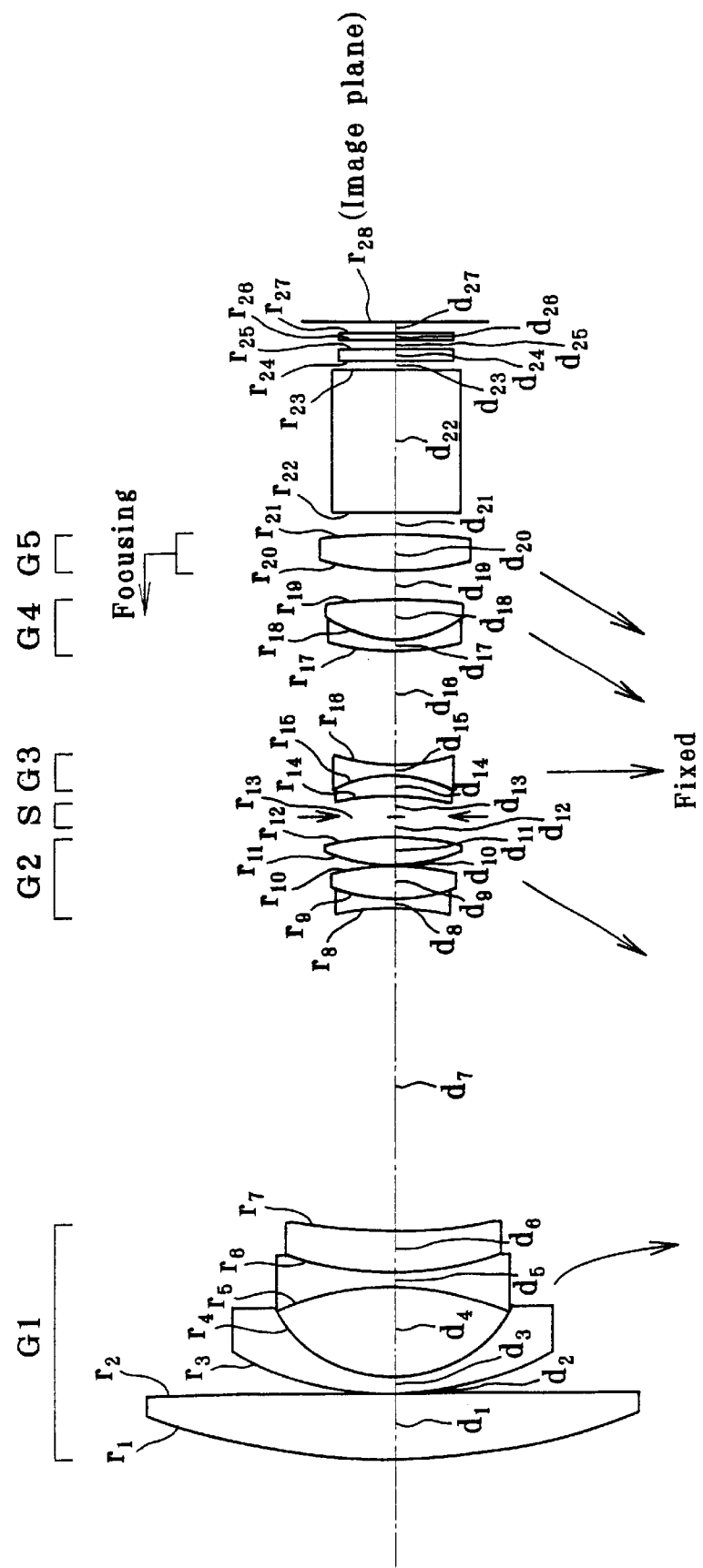
FIG. 2 is a sectional schematic illustrative of the lens arrangement of Example 2 of the zoom lens system according to the invention at its wide-angle end.

Example 2 is directed to a zoom lens system having a focal length of 7.00 to 21.00, a field angle of 76.30 to 29.40 and an F-number of 2.01 to 2.54. As shown in FIG. 2, the first lens group G1 is made up of a positive meniscus lens convex on an object side thereof, a negative meniscus lens convex on an object side thereof and a cemented lens consisting of a double-concave negative lens and a positive meniscus lens convex on an object side thereof. The second lens group G2 is made up of a cemented lens consisting of a double-concave negative lens and a double-convex positive lens, and a double-convex positive lens with a stop S located in the rear thereof. The third lens group G3 is made up of a cemented lens consisting of a positive meniscus lens convex on an image plane side thereof and a double-concave negative lens. The fourth lens group G4 is made up of a cemented lens consisting of a negative meniscus lens convex on an object side thereof and a double-convex positive lens. The fifth lens group G5 is made up of one double-convex positive lens. Three aspherical surfaces are used; one at the object side-surface of the cemented lens in the first lens group G1, one at the object side-surface of the double-convex positive lens in the second lens group G2 and one at the object side-surface of the double-convex positive lens in the fifth lens group G5. During zooming from the wide-angle end to the telephoto end of the zoom lens system, the stop S and the third lens group G3 remain fixed, while the first lens group G1 moves toward the image plane side, the second lens group G2 moves toward the object side and the fourth and fifth lens groups G4 and G5 move toward the object side, as indicated by arrows. In the meantime, the space between the first and second lens groups G1 and G2, the space between the third and fourth lens groups G3 and G4, and the space between the third and fifth lens groups G3 and G5 becomes narrow. On the other hand, the space between the second and third lens groups G2 and G3, the space between the fourth lens group G4 and the image plane, and the space between the fifth lens group G5 and the image plane becomes wide. Upon movement of an object point, focusing is carried out with the fifth lens group G5. In this case, the fifth lens group G5 is moved toward the object side for focusing from the infinite direction to a nearby distance direction.

Figure 3:
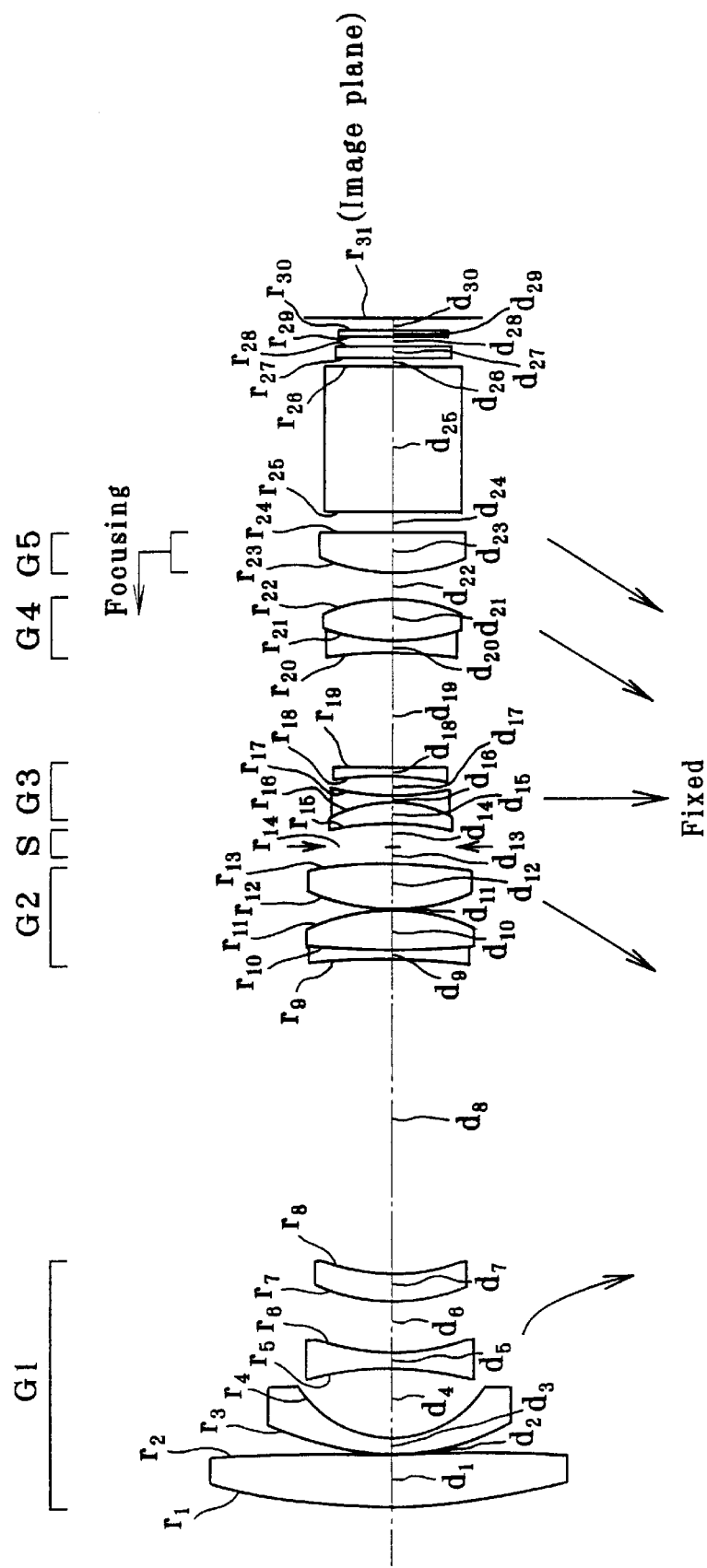
FIG. 3 is a sectional schematic illustrative of the lens arrangement of Example 3 of the zoom lens system according to the invention at its wide-angle end.

Example 3 is directed to a zoom lens system having a focal length of 7.00 to 21.00, a field angle of 76.3° to 29.40 and an F-number of 2.01 to 3.17. As shown in FIG. 3, the first lens group G1 is made up of a double-convex positive lens having a strong convex surface on an object side thereof, a negative meniscus lens convex on an object side thereof, a double-concave negative lens and a positive meniscus lens convex on an object side thereof. The second lens group G2 is made up of a cemented lens consisting of a double-concave negative lens and a double-convex positive lens, and a double-convex positive lens with a stop S located in the rear thereof. The third lens group G3 is made up of a cemented lens consisting of a positive meniscus lens convex on an image plane side thereof and a double-concave negative lens, and a double-concave negative lens. The fourth lens group G4 is made up of a cemented lens consisting of a double-concave negative lens and a double-convex positive lens. The fifth lens group G5 is made up of one positive meniscus lens convex on an object side thereof. Three aspherical surfaces are used; one at the object side-surface of the double-concave lens in the first lens group G1, one at the object side-surface of the double-convex positive lens in the second lens group G2 and one at the object side-surface of the double-convex positive lens in the fifth lens group G5. During zooming from the wide-angle end to the telephoto end of the zoom lens system, the stop S and the third lens group G3 remain fixed, while the first lens group G1 moves toward the image plane side, the second lens group G2 moves toward the object side and the fourth and fifth lens groups G4 and G5 move toward the object side, as indicated by arrows. In the meantime, the space between the first and second lens groups G1 and G2, the space between the third and fourth lens groups G3 and G4, and the space between the third and fifth lens groups G3 and G5 becomes narrow. On the other hand, the space between the second and third lens groups G2 and G3, the space between the fourth lens group G4 and the image plane, and the space between the fifth lens group G5 and the image plane becomes wide. Upon movement of an object point, focusing is carried out with the fifth lens group G5. In this case, the fifth lens group G5 is moved toward the object side for focusing from the infinite direction to a nearby distance direction.

Figure 4:
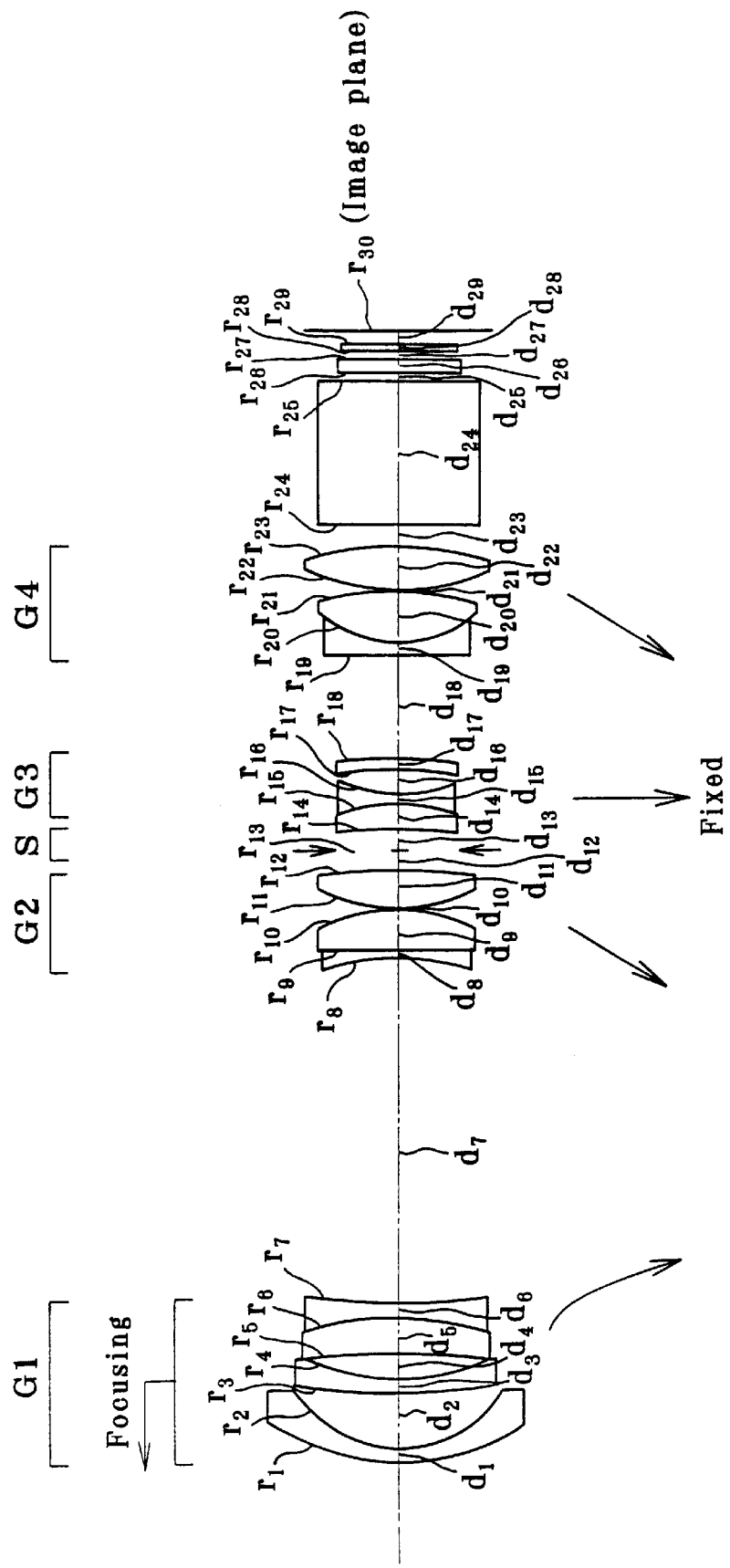
FIG. 4 is a sectional schematic illustrative of the lens arrangement of Example 4 of the zoom lens system according to the invention at its wide-angle end.
Figure 5A:
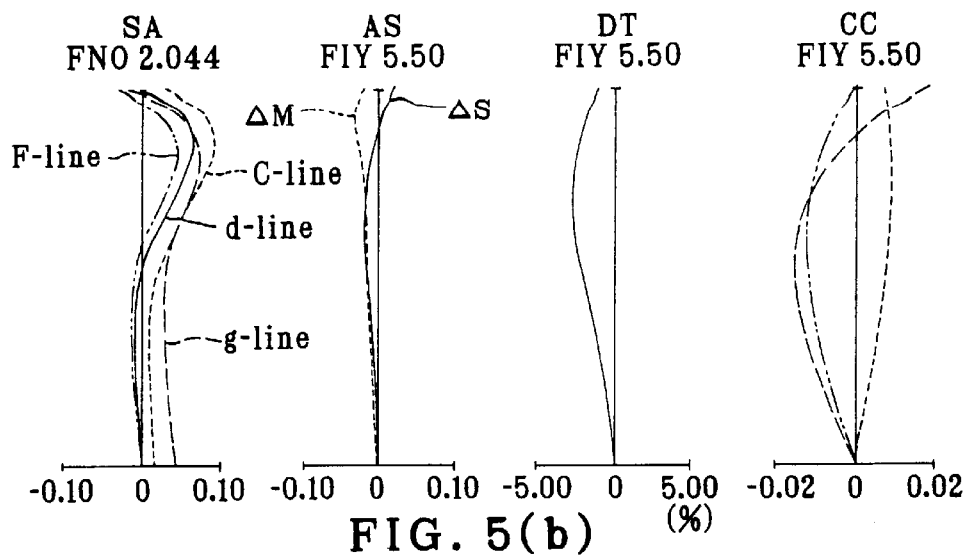
FIGS. 5(*a*), 5(*b*) and 5(*c*) are aberration diagrams for Example 1 upon focused at infinity.
Figure 5B:
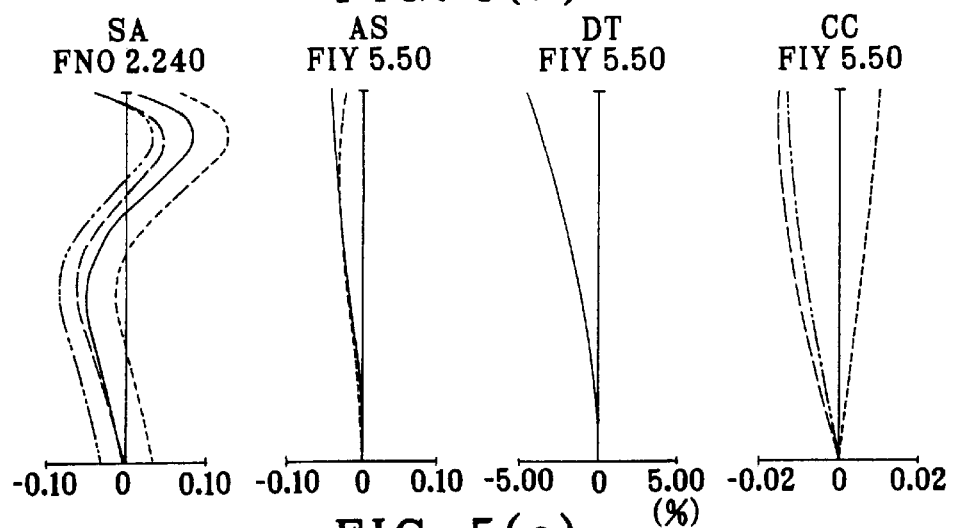
Figure 5C:
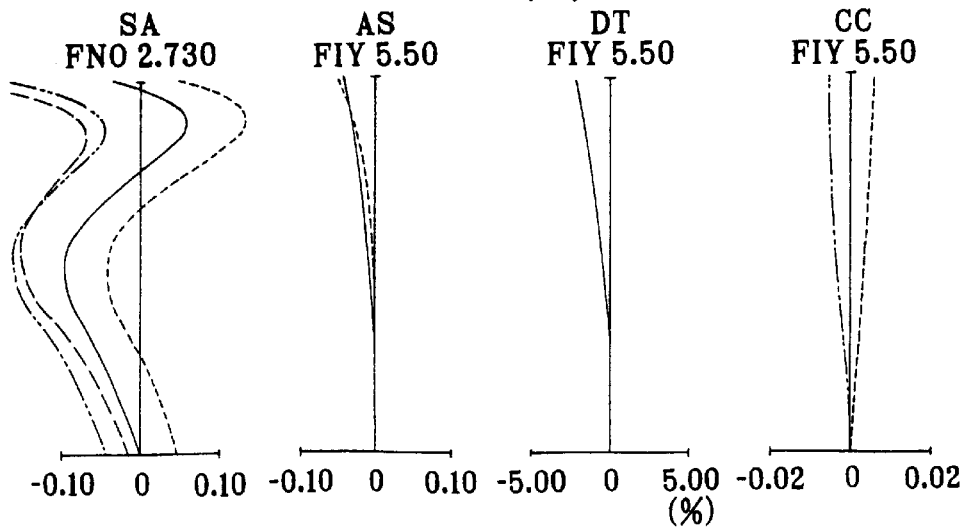
Figure 6A:
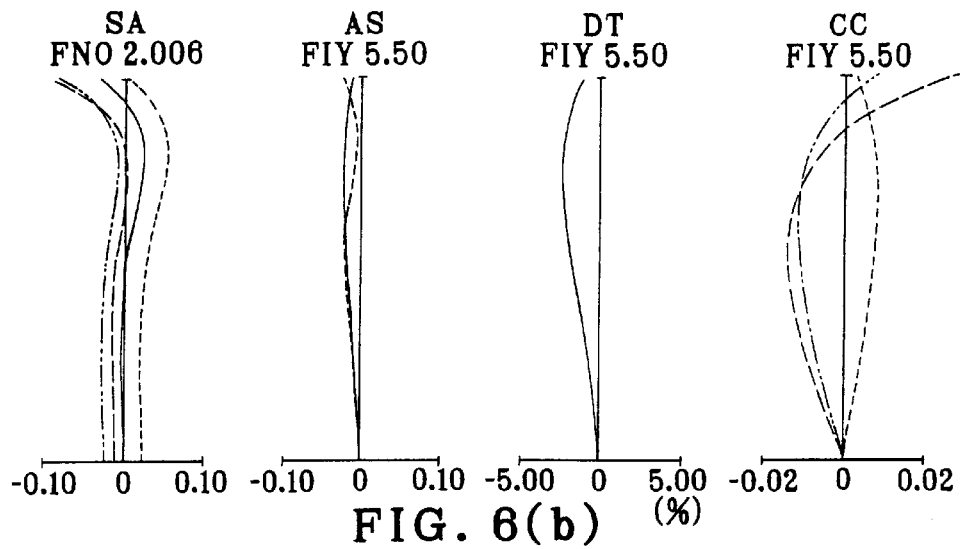
FIGS. 6(*a*), 6(*b*) and 6(*c*) are aberration diagrams for Example 2 upon focused at infinity.
Figure 6B:
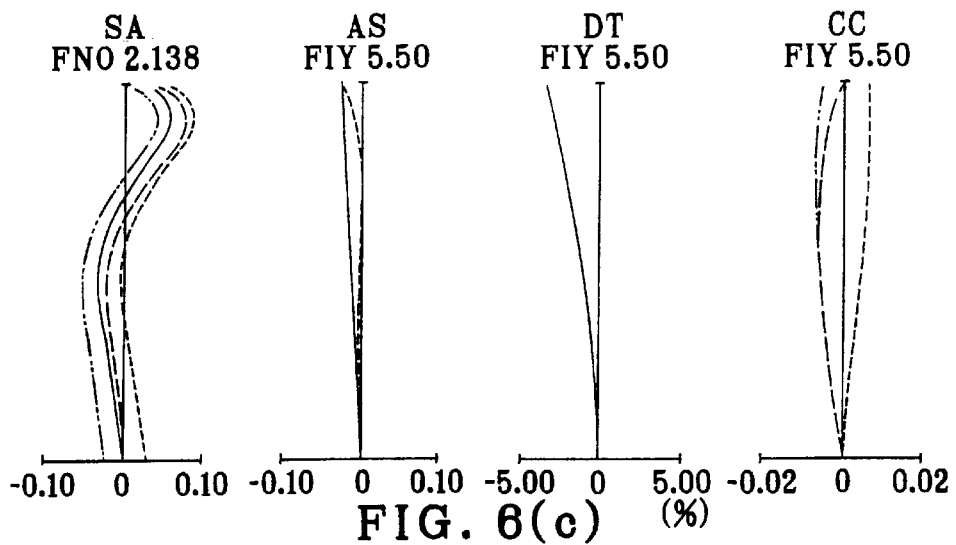
Figure 6C:
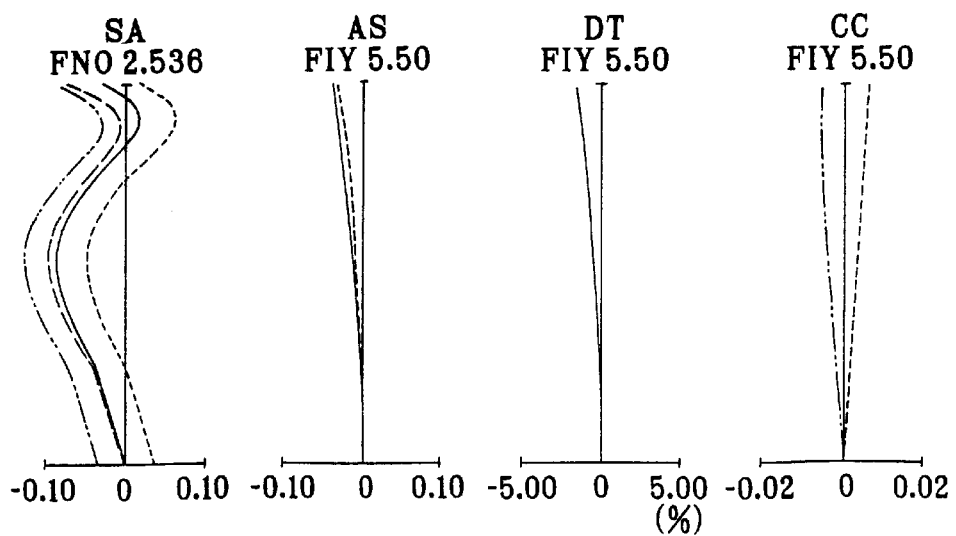
Figure 8A:
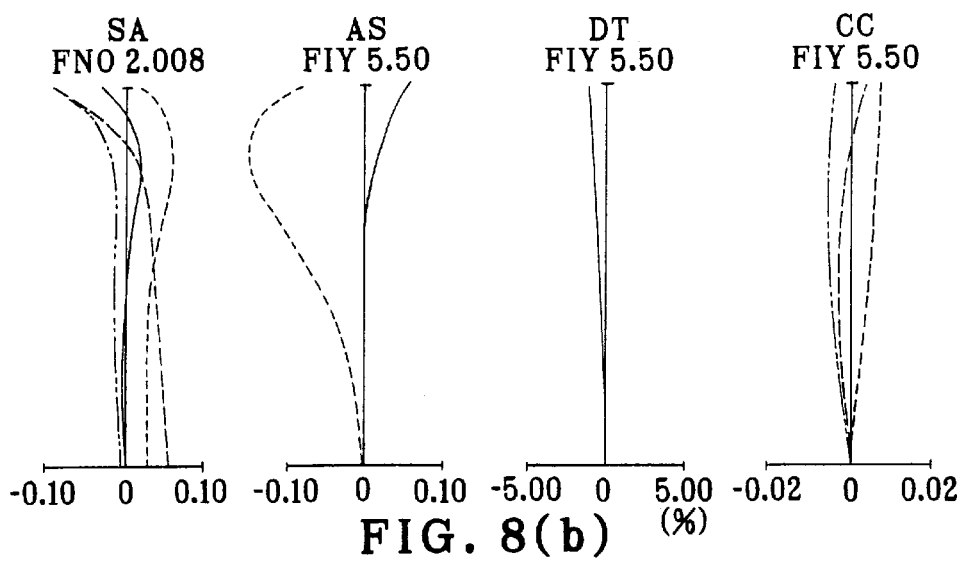
FIGS. 8(*a*), 8(*b*) and 8(*c*) are aberration diagrams for Example 4 upon focused at infinity.
Figure 8B:
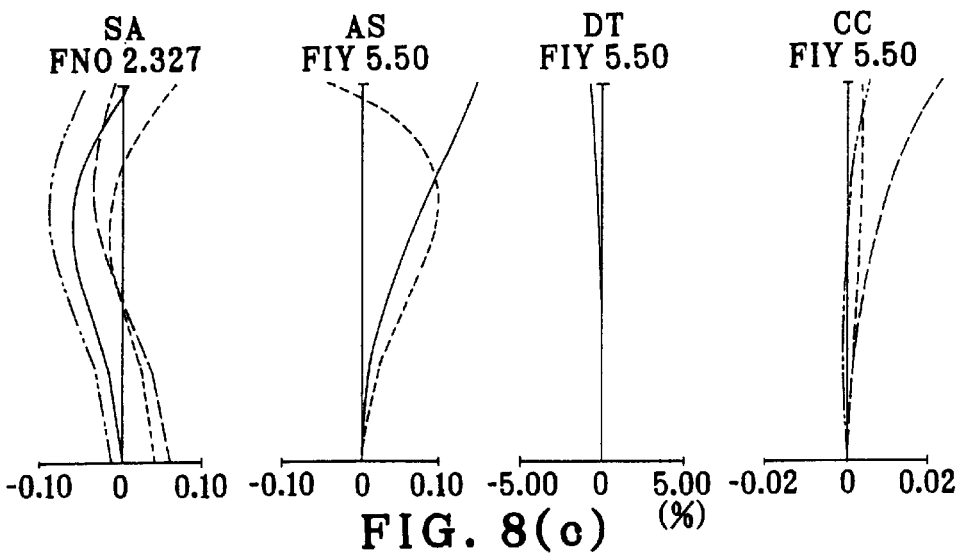
Figure 8C:
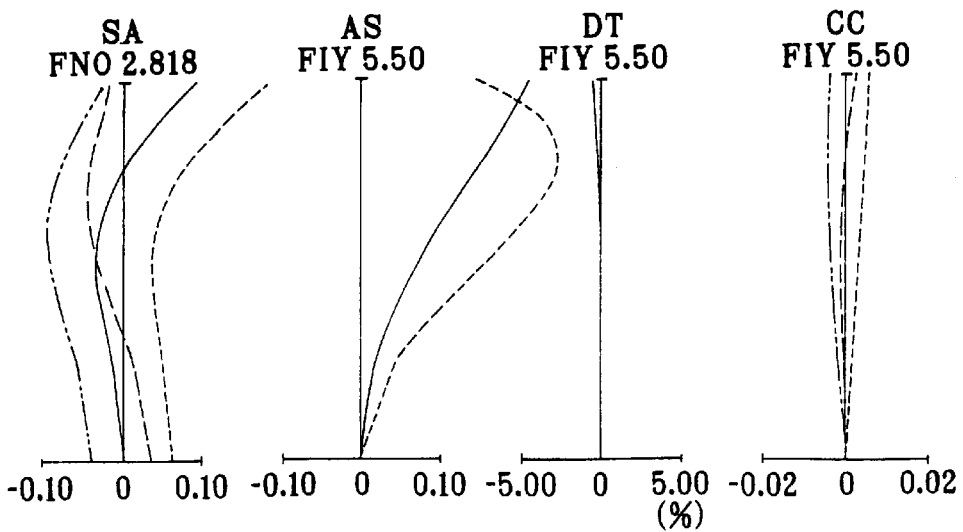

Example 4 is directed to a zoom lens system having a focal length of 7.00 to 21.00, a field angle of 76.3° to 29.4° and an F-number of 2.01 to 2.82. As shown in FIG. 4, the first lens group G1 is made up of two negative meniscus lenses, each having a strong convex surface on an object side thereof and a cemented lens consisting of a positive meniscus lens convex on an image plane side thereof and a double-concave negative lens. The second lens group G2 is made up of a cemented lens consisting of a negative meniscus lens convex on an image plane side thereof and a positive meniscus lens convex on an image plane side thereof, and a double-convex positive lens with a stop S located in the rear thereof. The third lens group G3 is made up of a cemented lens consisting of a positive meniscus lens convex on an image plane side thereof and a double-concave negative lens, and a negative meniscus lens having a strong convex surface on an object side thereof. The fourth lens group G4 is made up of a cemented lens consisting of a negative meniscus lens having a strong convex surface on an object side and a double-convex positive lens. Three aspherical surfaces are used; one at the image plane side-surface of the second negative meniscus lens in the first lens group G1, one at the object side-surface of the double-convex positive lens in the second lens group G2 and one at the object side-surface of the double-convex positive lens in the fourth lens group G4. During zooming from the wide-angle end to the telephoto end of the zoom lens system, the stop S and the third lens group G3 remain fixed, while the first lens group G1 moves toward the image plane side, the second lens group G2 moves toward the object side and the fourth lens group G4 moves toward the object side, as indicated by arrows. In the meantime, the space between the first and second lens groups G1 and G2, and the space between the third and fourth lens groups G3 and G4 becomes narrow. On the other hand, the space between the second and third lens groups G2 and G3, and the space between the fourth lens group G4 and the image plane becomes wide. Upon movement of an object point, focusing is carried out from the infinite direction to a nearby distance direction. In this case, the spaces between the first lens group G1 and the second to fourth lens groups G2 to G4 are narrowed at the wide-angle end while the first lens group G1 is moved toward the object side at an intermediate focal length and at the telephoto end.

Set out below are lens data on each example. The symbols used hereinafter but not hereinbefore have the following meanings.

f . . . focal length of the zoom lens system,
FNO . . . F-number,
2ω . . . field angle,
WE . . . wide-angle end,
ST . . . intermediate focal length,
TE . . . telephoto end,
r1, r2, . . . radius of curvature of each lens surface,
d1, d2, . . . space between adjacent lens surfaces,
nd1, nd2, . . . d-line refractive index of each lens, and
νd1, νd2, . . . d-line Abbe number of each lens.

Here let x stand for an optical axis where the direction of propagation of light is positive and y indicate a direction perpendicular with respect to the optical axis. Then, the shape of an aspherical surface is given by $$x=(y^2/r)/[1+\{1-(K+1)(y/r)^2\}^{1/2}]+A_4 y^4+A_6 y^6+A_8 y^8+A_{10} y^{10}$$

Here r is a paraxial radius of curvature, K is a conical coefficient, and A4, A6, A8 and A10 are the fourth, sixth, eighth and tenth aspherical coefficients, respectively.

EXAMPLE 1 f = 7.0000~13.7004~21.0000
$F_{NO}$ = 2.0442~2.2396~2.7301
2ω = 76.3°~43.8°~29.4°

| | | | | | | | |
|---|---|---|---|---|---|---|---|
| $r_1$ = | 91.7296 | $d_1$ = | 7.5000 | $n_{d1}$ = | 1.69680 | $ν_{d1}$ = | 55.53 |
| $r_2$ = | 287.8496 | $d_2$ = | 0.2000 | | | | |
| $r_3$ = | 47.8618 | $d_3$ = | 1.5000 | $n_{d2}$ = | 1.77250 | $ν_{d2}$ = | 49.60 |
| $r_4$ = | 16.3969 | $d_4$ = | 11.0000 | | | | |
| $r_5$ = | −75.9174 | $d_5$ = | 1.5000 | $n_{d3}$ = | 1.56384 | $ν_{d3}$ = | 60.67 |
| (Aspheric) | | | | | | | |
| $r_6$ = | 16.5686 | $d_6$ = | 6.0000 | $n_{d4}$ = | 1.84666 | $ν_{d4}$ = | 23.78 |
| $r_7$ = | 28.6535 | $d_7$ = | (Variable) | | | | |
| $r_8$ = | −34.1397 | $d_8$ = | 0.9000 | $n_{d5}$ = | 1.75520 | $ν_{d5}$ = | 27.51 |
| $r_9$ = | 47.2127 | $d_9$ = | 4.0000 | $n_{d6}$ = | 1.57099 | $ν_{d6}$ = | 50.80 |
| $r_{10}$ = | −69.1396 | $d_{10}$ = | 0.2000 | | | | |
| $r_{11}$ = | 18.4227 | $d_{11}$ = | 3.5000 | $n_{d7}$ = | 1.58913 | $ν_{d7}$ = | 61.14 |
| (Aspheric) | | | | | | | |
| $r_{12}$ = | −29.3472 | $d_{12}$ = | (Variable) | | | | |
| $r_{13}$ = | ∞ (Stop) | $d_{13}$ = | 2.7647 | | | | |
| $r_{14}$ = | −23.9786 | $d_{14}$ = | 2.5000 | $n_{d8}$ = | 1.80100 | $ν_{d8}$ = | 34.97 |
| $r_{15}$ = | −12.2274 | $d_{15}$ = | 1.0000 | $n_{d9}$ = | 1.51823 | $ν_{d9}$ = | 58.90 |
| $r_{16}$ = | 24.7381 | $d_{16}$ = | (Variable) | | | | |
| $r_{17}$ = | 125.9661 | $d_{17}$ = | 2.5000 | $n_{d10}$ = | 1.69680 | $ν_{d10}$ = | 55.53 |
| $r_{18}$ = | −45.3982 | $d_{18}$ = | (Variable) | | | | |
| (Aspheric) | | | | | | | |
| $r_{19}$ = | 22.9888 | $d_{19}$ = | 6.0000 | $n_{d11}$ = | 1.58913 | $ν_{d11}$ = | 61.14 |
| $r_{20}$ = | −15.7476 | $d_{20}$ = | 1.2000 | $n_{d12}$ = | 1.80518 | $ν_{d12}$ = | 25.42 |
| $r_{21}$ = | −47.3187 | $d_{21}$ = | (Variable) | | | | |
| $r_{22}$ = | ∞ | $d_{22}$ = | 17.0000 | $n_{d13}$ = | 1.51633 | $ν_{d13}$ = | 64.14 |
| $r_{23}$ = | ∞ | $d_{23}$ = | 1.0000 | | | | |
| $r_{24}$ = | ∞ | $d_{24}$ = | 1.6000 | $n_{d14}$ = | 1.54771 | $ν_{d14}$ = | 62.84 |
| $r_{25}$ = | ∞ | $d_{25}$ = | 1.0000 | | | | |
| $r_{26}$ = | ∞ | $d_{26}$ = | 0.7500 | $n_{d15}$ = | 1.52249 | $ν_{d15}$ = | 59.84 |
| $r_{27}$ = | ∞ | $d_{27}$ = | 0.8638 | | | | |
| $r_{28}$ = | ∞ | | | | | | |
| (Image plane) | | | | | | | |

Aspherical Coefficients

5th surface

K = 0
$A_4$ = 1.0781 × 10$^{-5}$
$A_6$ = 1.6270 × 10$^{-8}$
$A_8$ = 0.0000
$A_{10}$ = 0.0000

11th surface

K = 0
$A_4$ = −5.8866 × 10$^{-5}$
$A_6$ = −1.5919 × 10$^{-7}$
$A_8$ = 1.9936 × 10$^{-9}$
$A_{10}$ = 0.0000

18th surface

K = 0
$A_4$ = −1.7356 × 10$^{-6}$
$A_6$ = 1.3962 × 10$^{-7}$
$A_8$ = −1.7316 × 10$^{-9}$
$A_{10}$ = 0.0000

| | WE | ST | TE |
|---|---|---|---|
| Spaces between surfaces at object distance ∞ | | | |
| $d_7$ | 37.57075 | 9.72435 | 2.00000 |
| $d_{12}$ | 2.10000 | 7.59133 | 13.50047 |
| $d_{16}$ | 13.40047 | 7.90914 | 2.00000 |
| $d_{18}$ | 3.00000 | 3.05679 | 2.94574 |
| $d_{21}$ | 2.4000 | 7.83454 | 13.85472 |
| Spaces between surfaces at object distance 200 mm | | | |
| $d_7$ | 37.57075 | 9.72435 | 2.00000 |
| $d_{12}$ | 2.10000 | 7.59133 | 13.50047 |
| $d_{16}$ | 13.40047 | 7.90914 | 2.00000 |
| $d_{18}$ | 2.74982 | 2.18149 | 0.92815 |
| $d_{21}$ | 2.65018 | 8.70984 | 15.87231 |

EXAMPLE 2 f = 6.9998~13.7009~21.0000
$F_{NO}$ = 2.0065~2.1378~2.5355
2ω = 76.3°~43.7°~29.4°

| | | | | | | | |
|---|---|---|---|---|---|---|---|
| $r_1$ = | 85.8891 | $d_1$ = | 7.5000 | $n_{d1}$ = | 1.69680 | $ν_{d1}$ = | 55.53 |
| $r_2$ = | 3494.1823 | $d_2$ = | 0.2000 | | | | |
| $r_3$ = | 39.6809 | $d_3$ = | 1.5000 | $n_{d2}$ = | 1.77250 | $ν_{d2}$ = | 49.60 |
| $r_4$ = | 15.6987 | $d_4$ = | 11.0000 | | | | |
| $r_5$ = | −28.8752 | $d_5$ = | 1.5000 | $n_{d3}$ = | 1.56384 | $ν_{d3}$ = | 60.67 |
| (Aspheric) | | | | | | | |
| $r_6$ = | 33.9701 | $d_6$ = | 5.0000 | $n_{d4}$ = | 1.84666 | $ν_{d4}$ = | 23.78 |
| $r_7$ = | 55.2665 | $d_7$ = | (Variable) | | | | |
| $r_8$ = | −27.5606 | $d_8$ = | 0.9000 | $n_{d5}$ = | 1.78590 | $ν_{d5}$ = | 44.20 |
| $r_9$ = | 20.3160 | $d_9$ = | 4.0000 | $n_{d6}$ = | 1.62280 | $ν_{d6}$ = | 57.05 |
| $r_{10}$ = | −30.0983 | $d_{10}$ = | 0.2000 | | | | |
| $r_{11}$ = | 20.3520 | $d_{11}$ = | 3.5000 | $n_{d7}$ = | 1.61772 | $ν_{d7}$ = | 49.81 |
| (Aspheric) | | | | | | | |
| $r_{12}$ = | −30.0124 | $d_{12}$ = | (Variable) | | | | |
| $r_{13}$ = | ∞ (Stop) | $d_{13}$ = | 2.7647 | | | | |
| $r_{14}$ = | −26.1295 | $d_{14}$ = | 2.5000 | $n_{d8}$ = | 1.80100 | $ν_{d8}$ = | 34.97 |
| $r_{15}$ = | −13.1776 | $d_{15}$ = | 1.0000 | $n_{d9}$ = | 1.51823 | $ν_{d9}$ = | 58.90 |
| $r_{16}$ = | 23.2662 | $d_{16}$ = | (Variable) | | | | |
| $r_{17}$ = | 33.2133 | $d_{17}$ = | 1.2000 | $n_{d10}$ = | 1.84666 | $ν_{d10}$ = | 23.78 |
| $r_{18}$ = | −12.8863 | $d_{18}$ = | 5.0000 | $n_{d11}$ = | 1.61800 | $ν_{d11}$ = | 63.33 |
| $r_{19}$ = | −53.3193 | $d_{19}$ = | (Variable) | | | | |
| $r_{20}$ = | 30.7837 | $d_{20}$ = | 4.5000 | $n_{d12}$ = | 1.69350 | $ν_{d12}$ = | 53.34 |
| (Aspheric) | | | | | | | |
| $r_{21}$ = | −107.8863 | $d_{21}$ = | (Variable) | | | | |
| $r_{22}$ = | ∞ | $d_{22}$ = | 17.0000 | $n_{d13}$ = | 1.51633 | $ν_{d13}$ = | 64.14 |
| $r_{23}$ = | ∞ | $d_{23}$ = | 1.0000 | | | | |
| $r_{24}$ = | ∞ | $d_{24}$ = | 1.6000 | $n_{d14}$ = | 1.54771 | $ν_{d14}$ = | 62.84 |
| $r_{25}$ = | ∞ | $d_{25}$ = | 1.0000 | | | | |

-continued $$f = 6.9998\sim13.7009\sim21.0000$$
$$F_{NO} = 2.0065\sim2.1378\sim2.5355$$
$$2\omega = 76.3°\sim43.7°\sim29.4°$$

| | | | | | | |
|---|---|---|---|---|---|---|
| $r_{26} =$ | ∞ | $d_{26} =$ | 0.7500 | $n_{d15} = 1.52249$ | $\nu_{d15} =$ | 59.84 |
| $r_{27} =$ | ∞ | $d_{27} =$ | 1.3402 | | | |
| $r_{28} =$ | ∞ | | | | | |
| | (Image plane) | | | | | |

Aspherical Coefficients

5th surface $K = 0$
$A_4 = 2.0897 \times 10^{-5}$
$A_6 = 3.4398 \times 10^{-8}$
$A_8 = 0.0000$
$A_{10} = 0.0000$ 11th surface $K = 0$
$A_4 = -3.6082 \times 10^{-5}$
$A_6 = -1.0082 \times 10^{-7}$
$A_8 = 7.8344 \times 10^{-10}$
$A_{10} = 0.0000$ 20th surface $K = 0$
$A_4 = 3.7594 \times 10^{-6}$
$A_6 = -3.8510 \times 10^{-11}$
$A_8 = 6.7843 \times 10^{-10}$
$A_{10} = 0.0000$

| | WE | ST | TE |
|---|---|---|---|
| | Spaces between surfaces at object distance ∞ | | |
| $d_7$ | 38.23696 | 9.95720 | 2.00000 |
| $d_{12}$ | 2.10000 | 7.45005 | 13.52309 |
| $d_{16}$ | 13.42309 | 8.07305 | 2.00000 |
| $d_{19}$ | 3.00000 | 2.83043 | 3.10552 |
| $d_{21}$ | 2.4000 | 7.91960 | 13.71758 |
| | Spaces between surfaces at object distance 200 mm | | |
| $d_7$ | 38.23696 | 9.95720 | 2.00000 |
| $d_{12}$ | 2.10000 | 7.45005 | 13.52309 |
| $d_{16}$ | 13.42309 | 8.07305 | 2.00000 |
| $d_{19}$ | 2.74293 | 1.94597 | 1.09377 |
| $d_{21}$ | 2.65707 | 8.80406 | 15.72933 |

EXAMPLE 3

$$f = 7.0005\sim13.7010\sim21.9993$$
$$F_{NO} = 2.0065\sim2.4932\sim3.1714$$
$$2\omega = 76.3°\sim43.7°\sim29.4°$$

| | | | | | | |
|---|---|---|---|---|---|---|
| $r_1 =$ | 89.3117 | $d_1 =$ | 6.0000 | $n_{d1} = 1.77250$ | $\nu_{d1} =$ | 49.60 |
| $r_2 =$ | -647.7642 | $d_2 =$ | 0.2000 | | | |
| $r_3 =$ | 34.6031 | $d_3 =$ | 1.5000 | $n_{d2} = 1.77250$ | $\nu_{d2} =$ | 49.60 |
| $r_4 =$ | 12.8763 | $d_4 =$ | 8.3000 | | | |
| $r_5 =$ | -29.0939 (Aspheric) | $d_5 =$ | 1.5000 | $n_{d3} = 1.60311$ | $\nu_{d3} =$ | 60.64 |
| $r_6 =$ | 24.5673 | $d_6 =$ | 6.0000 | | | |
| $r_7 =$ | 20.3537 | $d_7 =$ | 3.5000 | $n_{d4} = 1.84666$ | $\nu_{d4} =$ | 23.78 |
| $r_8 =$ | 21.0670 | $d_8 =$ | (Variable) | | | |
| $r_9 =$ | -73.8720 | $d_9 =$ | 0.9000 | $n_{d5} = 1.84666$ | $\nu_{d5} =$ | 23.78 |
| $r_{10} =$ | 137.3763 | $d_{10} =$ | 5.0000 | $n_{d6} = 1.56384$ | $\nu_{d6} =$ | 60.67 |
| $r_{11} =$ | -22.2244 | $d_{11} =$ | 0.2000 | | | |
| $r_{12} =$ | -23.9564 (Aspheric) | $d_{12} =$ | 5.0000 | $n_{d7} = 1.69680$ | $\nu_{d7} =$ | 55.53 |
| $r_{13} =$ | -52.6886 | $d_{13} =$ | (Variable) | | | |
| $r_{14} =$ | ∞(Stop) | $d_{14} =$ | 2.7647 | | | |
| $r_{15} =$ | -23.1171 | $d_{15} =$ | 2.5000 | $n_{d8} = 1.80518$ | $\nu_{d8} =$ | 25.42 |
| $r_{16} =$ | -14.0414 | $d_{16} =$ | 1.0000 | $n_{d9} = 1.56384$ | $\nu_{d9} =$ | 60.67 |
| $r_{17} =$ | 49.9769 | $d_{17} =$ | 2.0000 | | | |
| $r_{18} =$ | -37.0848 | $d_{18} =$ | 1.0000 | $n_{d10} = 1.69680$ | $\nu_{d10} =$ | 55.53 |
| $r_{19} =$ | 288.8888 | $d_{19} =$ | (Variable) | | | |
| $r_{20} =$ | -49.2028 | $d_{20} =$ | 1.2000 | $n_{d11} = 1.84666$ | $\nu_{d11} =$ | 23.78 |
| $r_{21} =$ | 24.5909 | $d_{21} =$ | 5.0000 | $n_{d12} = 1.61800$ | $\nu_{d12} =$ | 63.33 |
| $r_{22} =$ | -16.7878 | $d_{22} =$ | (Variable) | | | |
| $r_{23} =$ | 24.1755 (Aspheric) | $d_{23} =$ | 4.5000 | $n_{d13} = 1.69350$ | $\nu_{d13} =$ | 53.34 |
| $r_{24} =$ | 656.8776 | $d_{24} =$ | (Variable) | | | |
| $r_{25} =$ | ∞ | $d_{25} =$ | 17.0000 | $n_{d14} = 1.51633$ | $\nu_{d14} =$ | 64.14 |
| $r_{26} =$ | ∞ | $d_{26} =$ | 1.0000 | | | |
| $r_{27} =$ | ∞ | $d_{27} =$ | 1.6000 | $n_{d15} = 1.54771$ | $\nu_{d15} =$ | 62.84 |
| $r_{28} =$ | ∞ | $d_{28} =$ | 1.0000 | | | |
| $r_{29} =$ | ∞ | $d_{29} =$ | 0.7500 | $n_{d16} = 1.52249$ | $\nu_{d16} =$ | 59.84 |
| $r_{30} =$ | ∞ | $d_{30} =$ | 1.3405 | | | |
| $r_{31} =$ | ∞ | | | | | |
| | (Image plane) | | | | | |

Aspherical Coefficients

5th surface $K = 0$
$A_4 = 1.7182 \times 10^{-5}$
$A_6 = 1.9444 \times 10^{-7}$
$A_8 = 0.0000$
$A_{10} = 0.0000$ 12th surface $K = 0$
$A_4 = -8.0315 \times 10^{-6}$
$A_6 = -2.8569 \times 10^{-8}$
$A_8 = -2.3674 \times 10^{-11}$
$A_{10} = 0.0000$ 23th surface $K = 0$
$A_4 = -1.2957 \times 10^{-5}$
$A_6 = 6.4404 \times 10^{-8}$
$A_8 = -3.1086 \times 10^{-10}$
$A_{10} = 0.0000$

| | WE | ST | TE |
|---|---|---|---|
| | Spaces between surfaces at object distance ∞ | | |
| $d_8$ | 36.75134 | 10.47951 | 3.00000 |
| $d_{13}$ | 2.10000 | 7.73013 | 13.62471 |
| $d_{19}$ | 13.52469 | 7.89458 | 2.00000 |
| $d_{22}$ | 3.00000 | 2.74156 | 3.14885 |
| $d_{24}$ | 2.4000 | 8.28852 | 13.77585 |
| | Spaces between surfaces at object distance 200 mm | | |
| $d_8$ | 36.75134 | 10.47951 | 3.00000 |
| $d_{13}$ | 2.10000 | 7.73013 | 13.62471 |
| $d_{19}$ | 13.52469 | 7.89458 | 2.00000 |
| $d_{22}$ | 2.73621 | 1.84585 | 1.11714 |
| $d_{24}$ | 2.66379 | 9.18244 | 15.80756 |

EXAMPLE 4

$$f = 7.0018\sim13.6989\sim20.9999$$
$$F_{NO} = 2.0075\sim2.3274\sim2.8180$$
$$2\omega = 76.3°\sim43.8°\sim29.4°$$

| | | | | | | |
|---|---|---|---|---|---|---|
| $r_1 =$ | 27.3769 | $d_1 =$ | 1.5000 | $n_{d1} = 1.78590$ | $\nu_{d1} =$ | 44.20 |
| $r_2 =$ | 14.1723 | $d_2 =$ | 6.5000 | | | |
| $r_3 =$ | 78.1671 | $d_3 =$ | 1.5000 | $n_{d2} = 1.69680$ | $\nu_{d2} =$ | 55.53 |

-continued $f = 7.0018 \sim 13.6989 \sim 20.9999$
$F_{NO} = 2.0075 \sim 2.3274 \sim 2.8180$
$2\omega = 76.3° \sim 43.8° \sim 29.4°$

| | | | | | | |
|---|---|---|---|---|---|---|
| $r_4 =$ | 21.5580 | $d_4 =$ | 3.0000 | | | |
| | (Aspheric) | | | | | |
| $r_5 =$ | −126.7015 | $d_5 =$ | 4.5000 | $n_{d3} =$ 1.72825 | $\nu_{d3} =$ | 28.46 |
| $r_6 =$ | −32.4354 | $d_6 =$ | 1.5000 | $n_{d4} =$ 1.60311 | $\nu_{d4} =$ | 60.64 |
| $r_7 =$ | 96.6504 | $d_7 =$ | (Variable) | | | |
| $r_8 =$ | −26.7539 | $d_8 =$ | 0.9000 | $n_{d5} =$ 1.80518 | $\nu_{d5} =$ | 25.42 |
| $r_9 =$ | −181.1768 | $d_9 =$ | 4.5000 | $n_{d6} =$ 1.56384 | $\nu_{d6} =$ | 60.67 |
| $r_{10} =$ | −19.0577 | $d_{10} =$ | 0.2000 | | | |
| $r_{11} =$ | 18.7226 | $d_{11} =$ | 4.5000 | $n_{d7} =$ 1.69350 | $\nu_{d7} =$ | 53.34 |
| | (Aspheric) | | | | | |
| $r_{12} =$ | −73.0693 | $d_{12} =$ | (Variable) | | | |
| $r_{13} =$ | ∞ (Stop) | $d_{13} =$ | 2.7647 | | | |
| $r_{14} =$ | −50.6452 | $d_{14} =$ | 3.0000 | $n_{d8} =$ 1.84666 | $\nu_{d8} =$ | 23.78 |
| $r_{15} =$ | −19.2095 | $d_{15} =$ | 1.0000 | $n_{d9} =$ 1.56384 | $\nu_{d9} =$ | 60.67 |
| $r_{16} =$ | 17.1621 | $d_{16} =$ | 3.0000 | | | |
| $r_{17} =$ | −32.6944 | $d_{17} =$ | 1.0000 | $n_{d10} =$ 1.69680 | $\nu_{d10} =$ | 55.53 |
| $r_{18} =$ | −72.4992 | $d_{18} =$ | (Variable) | | | |
| $r_{19} =$ | 2586.4779 | $d_{19} =$ | 1.2000 | $n_{d11} =$ 1.84666 | $\nu_{d11} =$ | 23.78 |
| $r_{20} =$ | 13.1575 | $d_{20} =$ | 6.0000 | $n_{d12} =$ 1.56384 | $\nu_{d12} =$ | 60.67 |
| $r_{21} =$ | −32.2541 | $d_{21} =$ | 0.2000 | | | |
| $r_{22} =$ | 26.5743 | $d_{22} =$ | 5.0000 | $n_{d13} =$ 1.69350 | $\nu_{d13} =$ | 53.34 |
| | (Aspheric) | | | | | |
| $r_{23} =$ | −34.4285 | $d_{23} =$ | (Variable) | | | |
| $r_{24} =$ | ∞ | $d_{24} =$ | 17.0000 | $n_{d14} =$ 1.51633 | $\nu_{d14} =$ | 64.14 |
| $r_{25} =$ | ∞ | $d_{25} =$ | 1.0000 | | | |
| $r_{26} =$ | ∞ | $d_{26} =$ | 1.6000 | $n_{d15} =$ 1.54771 | $\nu_{d15} =$ | 62.84 |
| $r_{27} =$ | ∞ | $d_{27} =$ | 1.0000 | | | |
| $r_{28} =$ | ∞ | $d_{28} =$ | 0.7500 | $n_{d16} =$ 1.52249 | $\nu_{d16} =$ | 59.84 |
| $r_{29} =$ | ∞ | $d_{29} =$ | 1.3394 | | | |
| $r_{30} =$ | (Image plane) | | | | | |

Aspherical Coefficients

4th surface $K = 0$
$A_4 = -3.9486 \times 10^{-5}$
$A_6 = -3.9019 \times 10^{-8}$
$A_8 = 0.0000$
$A_{10} = 0.0000$ 11th surface $K = 0$
$A_4 = -2.2138 \times 10^{-5}$
$A_6 = -6.3498 \times 10^{-8}$
$A_8 = 7.7855 \times 10^{-11}$
$A_{10} = 0.0000$ 22th surface $K = 0$
$A_4 = -3.1795 \times 10^{-6}$
$A_6 = 6.2923 \times 10^{-8}$
$A_8 = -1.0846 \times 10^{-10}$
$A_{10} = 0.0000$

| | WE | ST | TE |
|---|---|---|---|
| Spaces between surfaces at object distance ∞ | | | |
| $d_7$ | 39.70727 | 10.23382 | 1.50000 |
| $d_{12}$ | 2.10000 | 7.38565 | 13.07541 |
| $d_{18}$ | 11.97541 | 6.68980 | 1.00000 |
| $d_{23}$ | 2.40000 | 7.68554 | 13.37542 |
| Spaces between surfaces at object distance 200 mm | | | |
| $d_7$ | 38.27575 | 11.33948 | 2.60566 |
| $d_{12}$ | 2.10000 | 7.38565 | 13.07541 |
| $d_{18}$ | 11.97541 | 6.68980 | 1.00000 |
| $d_{23}$ | 2.92387 | 7.68554 | 13.37542 |

FIGS. 5 to 8 are aberration diagrams for Examples 1 to 4 upon focused at infinity. In these diagrams, (a) stands for aberrations at the wide-angle end, (b) aberrations at an intermediate focal length, and (c) aberrations at the telephoto end, while SA, AS, DT and CC represent spherical aberrations, astigmatism, distortion and chromatic aberration of magnification, respectively. FLY stands for an image height.

Set out in the following table are the values of parameters with respect to conditions (1) to (18) in Examples 1 to 4.

| | Example 1 | Example 2 | Example 3 | Example 4 |
|---|---|---|---|---|
| $\beta\nu$ | 0.3882 | 0.4122 | 0.4117 | *** |
| $\Delta_{L4}$ | 11.40 | 11.423 | 11.525 | *** |
| $\Delta_{L5}$ | 11.45 | 11.317 | 11.376 | *** |
| $D_{45}$ | 2.946 | 3.106 | 3.149 | *** |
| $f_5$ | 35.144 | 35.000 | 36.087 | *** |
| $R_{51}$ | 22.989 | 30.784 | 24.176 | *** |
| $R_{52}$ | −47.319 | −107.886 | 656.878 | *** |
| $f_1$ | −20.243 | −19.282 | −13.048 | −15.646 |
| $f_W$ | 7.000 | 7.000 | 7.000 | 7.0002 |
| $n_1$ | 1.69680 | 1.6968 | 1.7725 | *** |
| $R_4$ | 16.397 | 15.699 | 12.876 | *** |
| $\nu_1$ | 55.53 | 55.53 | 49.60 | *** |
| $D_6$ | *** | *** | 6.000 | *** |
| $R_2$ | *** | *** | *** | 14.172 |
| $Hb_{1abs}$ | 5.645 | 5.461 | 8.913 | 8.130 |
| $f_2$ | 26.082 | 23.965 | 17.970 | 18.636 |
| $f_{31}$ | *** | *** | −34.769 | −28.269 |
| $f_{32}$ | *** | *** | −47.108 | −86.351 |

Set out below are also the values for other conditions in Examples 1 to 4.

Example 1

| | |
|---|---|
| $\Delta_{LF}/\Delta_{L4}$ | 1.004 |
| $D_{45}/f_5$ | 0.0838 |
| $(R_{51} + R_{52})/(R_{51} - R_{52})$ | −0.346 |
| $f_1/f_W$ | −2.89 |
| $R_4/f_W$ | 2.342 |
| $Hb_{1abs}/f_{1abs}$ | 0.278 |
| $Hb_{1abs}/(f_{1abs} \cdot f_2)$ | 0.0107 |
| Zoom Ratio | 3.0 |
| Field Angle 2ω at the Wide-Angle End | 76.3° |

Example 2

| | |
|---|---|
| $\Delta_{LF}/\Delta_{L4}$ | 0.991 |
| $D_{45}/f_5$ | 0.0887 |
| $(R_{51} + R_{52})/(R_{51} - R_{52})$ | −0.556 |
| $F_1/f_W$ | −2.755 |
| $R_4/f_W$ | 2.243 |
| $Hb_{1abs}/f_{1abs}$ | 0.283 |
| $Hb_{1abs}/(f_{1abs} \cdot f_2)$ | 0.0118 |
| Zoom Ratio | 3.0 |
| Field Angle 2ω at the Wide-Angle End | 76.3° |

Example 3

| | |
|---|---|
| $\Delta_{L5}/\Delta_{L4}$ | 0.987 |
| $D_{45}/f_5$ | 0.0873 |
| $(R_{51} + R_{52})/(R_{51} - R_{52})$ | −1.076 |
| $f_1/f_W$ | −1.864 |
| $R_4/f_W$ | 1.839 |
| $D_6/f_W$ | 0.857 |
| $Hb_{1abs}/f_{1abs}$ | 0.683 |
| $Hb_{1abs}/(f_{1abs} \cdot f_2)$ | 0.0380 |
| $f_{31}/f_{32}$ | 0.738 |
| Zoom Ratio | 3.0 |
| Field Angle 2ω at the Wide-Angle End | 76.3° |

Example 4

| | |
|---|---|
| $f_1/f_2$ | −2.235 |
| $R_2/f_W$ | 2.024 |
| $Hb_{1abs}/f_{1abs}$ | 0.520 |
| $Hb_{1abs}/(f_{1abs} \cdot f_2)$ | 0.0279 |
| $f_{31}/f_{32}$ | 0.327 |

| | |
|---|---|
| Zoom Ratio | 3.0 |
| Field Angle 2ω at the Wide-Angle End | 76.3° |

Figure 9A:
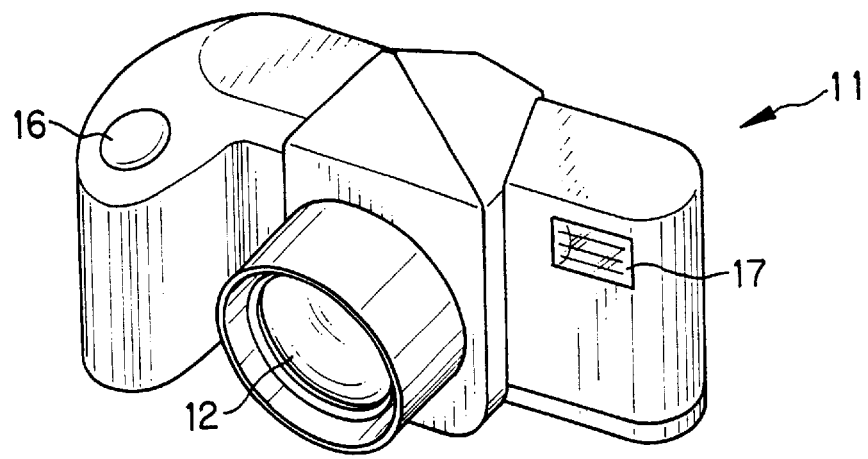
FIGS. 9(*a*), 9(*b*) and 9(*c*) are schematics illustrative of an electronic camera to which the zoom lens system according to the present invention may be applied.
Figure 9B:
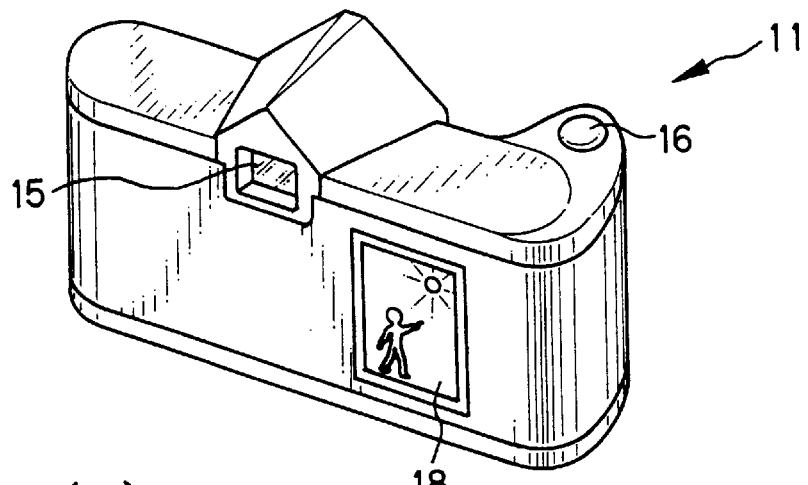
Figure 9C:
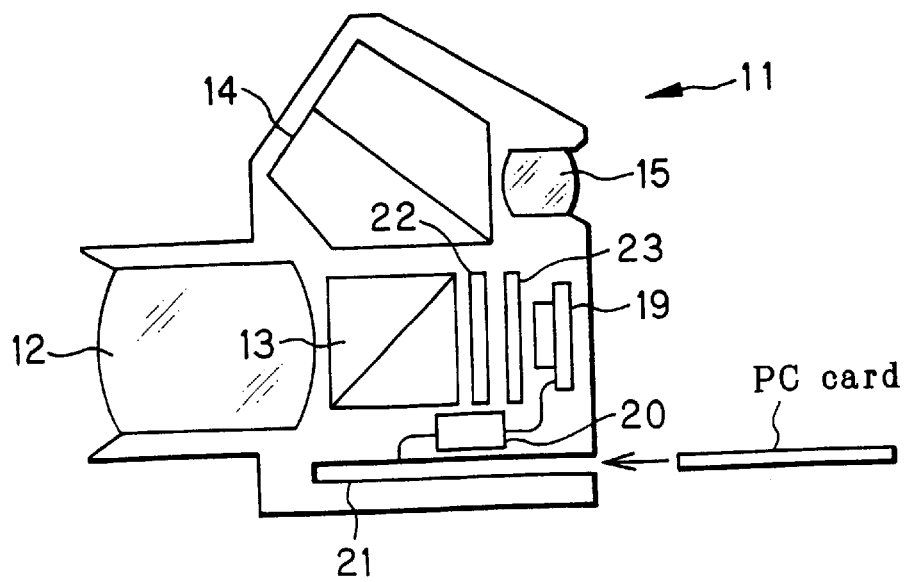

Such large-aperture yet wide-angle zoom lens systems as described above may be used as a phototaking objective optical system 12 for such an electronic camera 11 as shown typically in FIG. 9. FIG. 9(a) is a perspective view of the electronic camera 11 as viewed from its front side, FIG. 9(b) is a perspective view of the electronic camera 11 as viewed from its rear side, and FIG. 9(c) is an optical path geometry illustrative of the optical system in the electronic camera 11. This electronic camera 11 comprises a phototaking optical system 12 having a phototaking optical path, a half-silvered mirror prism 13 located in the optical path through the phototaking optical system 12 for branching a finder optical path therefrom, a penta prism 14 having a roof reflecting surface for erecting a finder image formed by the half-silvered mirror prism 13, an eyepiece lens 15, a release button 16, a strobe 17, a liquid crystal display monitor 18, a CCD 19, a controller 20 for converting an image entered into the CCD 19 to an electric signal, a data write device 21 for electrically recording a phototaken image in a recording medium (e.g., a PC card), etc.

Figure 10:
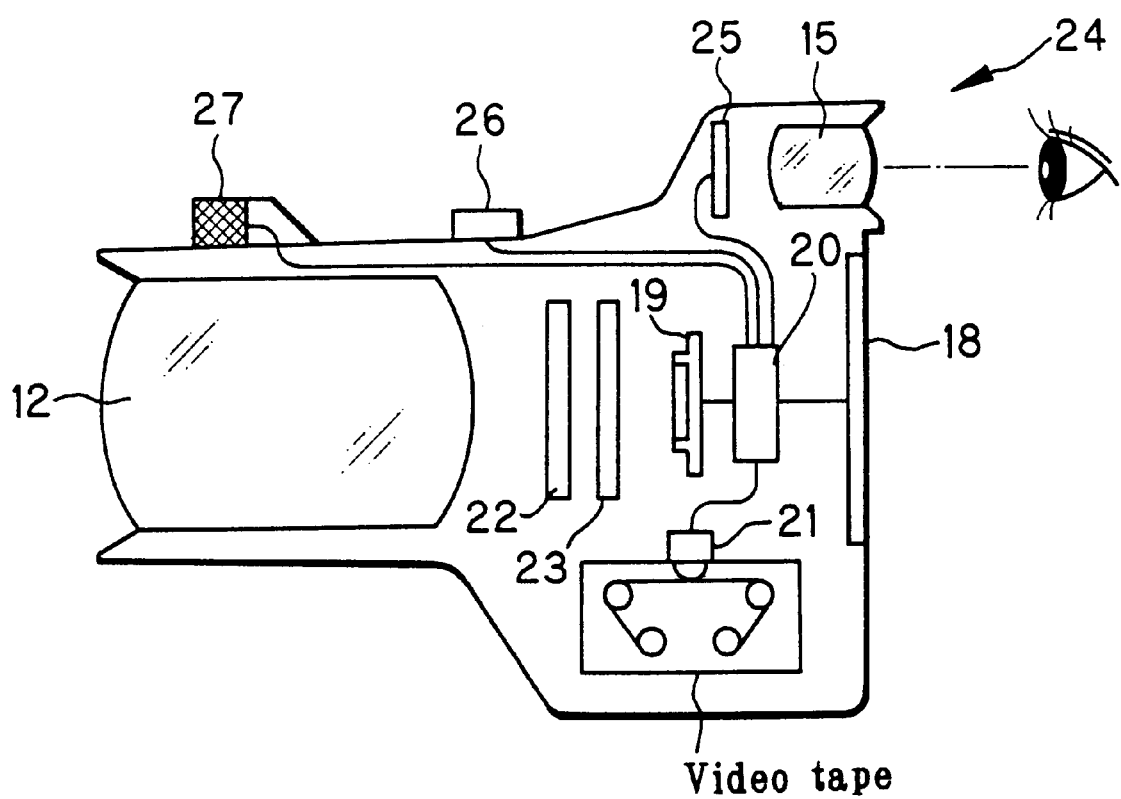
FIG. 10 is a schematic illustrative of a video camera to which the zoom lens system according to the present invention may be applied.
Figure 12:
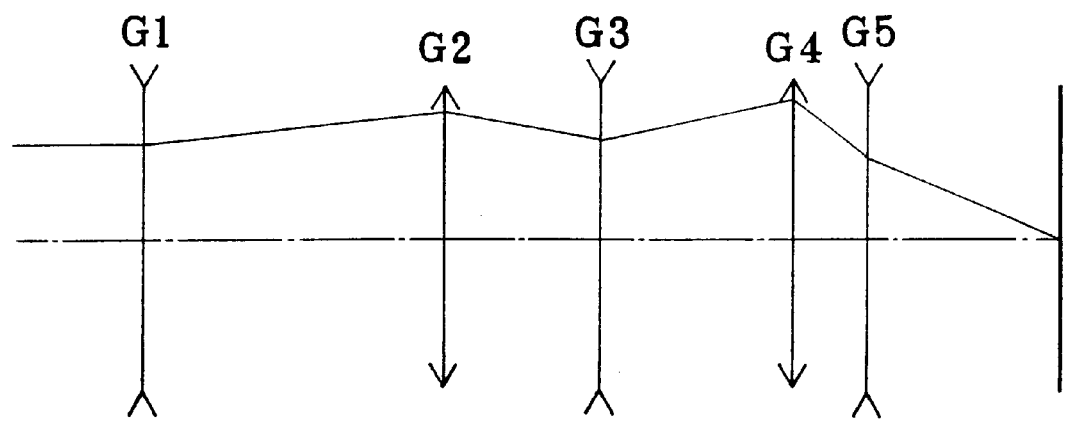
FIG. 12 is a geometry illustrative of a conventional type zoom lens where a negative lens group located on the image side is used as a focusing group.
Figure 13:
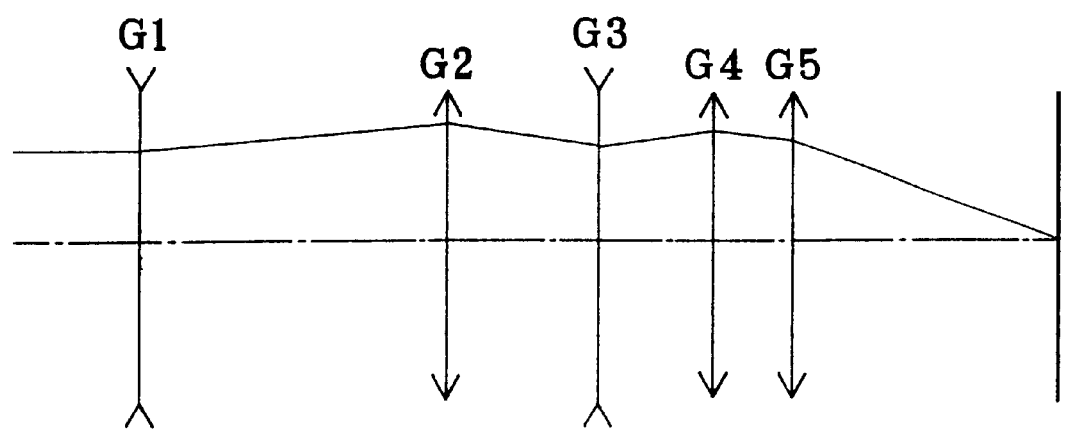
FIG. 13 is a geometry illustrative of the construction of the zoom lens system according to the present invention.

The large-aperture yet wide-angle zoom lens system of the present invention may also be used as a phototaking objective optical system 12 for such a video camera 24 as shown conceptually in FIG. 10 as an example. FIG. 10 is an optical path geometry illustrative of an optical system through the video camera 24 which comprises a phototaking optical system 12 having a phototaking optical path, a CCD 19 for phototaking an image formed by the phototaking optical system 12, an LCD (liquid crystal display device) 25 for displaying an image phototaken by CCD 19, an eyepiece lens 15 for guiding the image from LCD 25 to the eyeball of an observer, a phototaking ON/OFF switch 26, a sound recording microphone 17, a liquid crystal display monitor 18, a controller 20 for converting an image entered into CCD 19 to an electric signal, a data write device 21 that enables the phototaken image to be electrically recorded in a recording medium (e.g., a magnetic tape, a digital video tape or a DVD), etc.

In addition, the optical path through the phototaking optical system 12 is provided therein with a low-pass filter 22 and an IR cut filter 23.

According to the present invention, there can be provided a high-performance, large-aperture yet wide-angle zoom lens system which lends itself to an electronic image pickup device in particular. There can also be provided a focusing method for a high-performance, large-aperture yet wide-angle zoom lens system lending itself to an electronic image pickup device in particular. According to the present invention, there can further be provided a high-performance, large-aperture yet wide-angle zoom lens system which has a zoom ratio of the order of 3 at a diagonal field angle of 75° (focal length 28 mm class as calculated on a 35 mm size basis) at its wide-angle end, so that it can be used with a single-lens reflex camera using a miniature electronic image pickup device with the number of pixels being of the order of 6,000,000.

What we claim is:

1. A zoom lens system comprising, in order from an object side of the zoom lens system, at least a first lens group having negative refracting power, a second lens group having positive refracting power, a third lens group having negative refracting power and a fourth lens group having positive refracting power, wherein said first lens group comprises, in order from an object side thereof, a positive lens element, a negative meniscus lens element, a negative lens element and a positive meniscus lens element, and satisfies conditions (9) to (13):

$$0.5 < D6/fw < 1.2 \tag{9}$$

$$-4.0 < f1/fw < -1.5 \tag{10}$$

$$1.55 < n1 < 1.8 \tag{11}$$

$$1.3 < R4/fw < 3.5 \tag{12}$$

$$37 < \upsilon 1 < 83 \tag{13}$$

where D6 is a space between said negative lens element and said positive meniscus lens element in said first lens group, f1 is a focal length of said first lens group, fw is a focal length of said zoom lens system at a wide-angle end thereon upon focused on an infinite object point, n1 is a refractive index of a medium of said positive lens element located nearest to said object side in said first lens group, R4 is a radius of curvature of a concave surface of said negative meniscus lens element in said first lens group, and υ1 is an Abbe number of a medium of said positive lens element located nearest to said object side in said first lens group.

2. The zoom lens system according to claim 1, which further satisfies condition (16):

$$0.15 < Hb_{1abs}/f_{1abs} < 0.9 \tag{16}$$

where $f_{1abs}$ is an absolute value of said focal length of said first lens group, and $Hb_{1abs}$ is an absolute value of a rear principal point position of said first lens group.

3. The zoom lens system according to claim 1, which further satisfies condition (17):

$$0.7 \times 10^{-2} \ mm^{-1} < Hb_{1abs}/(f_{1abs} \cdot f_2) < 6 \times 10^{-2} \ mm^{-1} \tag{17}$$

where $f_{1abs}$ is an absolute value of said focal length of said first lens group, $Hb_{1abs}$ is an absolute value of a rear principal point position of said first lens group, and $f_2$ is a focal length of said second lens group.

4. The zoom lens system according to claim 1, wherein said third lens group comprises two lens component, i.e., a cemented concave lens component and a negative single lens component, and which further satisfies condition (18):

$$0.1 < f_{31}/f_{32} < 1 \tag{18}$$

where $f_{31}$ is a focal length of said cemented concave lens component in said third lens group, and $f_{32}$ is a focal length of said negative single lens component in said third lens group.

5. The zoom lens system according to claim 1, which further satisfies at least two of conditions (16), (17) and (18):

$$0.15 < Hb_{1abs}/f_{1abs} < 0.9 \tag{16}$$

$$0.7 \times 10^{-2} \ mm^{-1} < Hb_{1abs}/(f_{1abs} \cdot f_2) < 6 \times 10^{-2} \ mm^{-1} \tag{17}$$

$$0.1 < f_{31}/f_{32} < 1 \tag{18}$$

where $f_{1abs}$ is an absolute value of said focal length of said first lens group, $Hb_{1abs}$ is an absolute value of a rear principal point position of said first lens group, $f_2$ is a focal length of said second lens group, $f_{31}$ is a focal length of said cemented concave lens component in said third lens group, and $f_{32}$ is a focal length of said negative single lens component in said third lens group.

6. The zoom lens system according to claim 1, wherein during zooming from said wide-angle end to said telephoto end, said first lens group moves closer toward said image side at said telephoto end than at said wide-angle end, said second lens group and said fourth lens group move constantly toward said object side, and said third lens group remains fixed.

7. The zoom lens system according to claim 6, wherein said second lens group and said fourth lens group move together.

8. The zoom lens system according to claim 1, which further comprises an aperture stop that moves together with said second lens group.

9. The zoom lens system according to claim 1, which further comprises an aperture stop that is fixed in the vicinity of said third lens group.

10. An image pick up system which uses a zoom lens system as recited in claim 1 as an image pickup objective optical system, and wherein an image pickup device is located on an image side of said zoom lens system.

11. The zoom lens system according to claim 6, wherein the second lens group and the fourth lens group move constantly toward the object side of the zoom lens system, and a ratio between the movement amounts of the second and fourth lens groups is 1.

* * * * *